(12) United States Patent
Ishida et al.

(10) Patent No.: US 6,347,016 B1
(45) Date of Patent: Feb. 12, 2002

(54) MASTER INFORMATION CARRIER, PROCESS FOR PRODUCING THE CARRIER, AND METHOD AND APPARATUS FOR RECORDING MASTER INFORMATION SIGNAL ON MAGNETIC RECORDING MEDIUM BY USING THE CARRIER

(75) Inventors: Tatsuaki Ishida, Osaka; Ryuji Sugita, Ibaraki; Kiyokazu Tohma, Osaka; Keizou Miyata, Osaka; Hiroshi Ryonai, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/101,590
(22) PCT Filed: Jul. 18, 1997
(86) PCT No.: PCT/JP97/02519
  § 371 Date: Jul. 13, 1998
  § 102(e) Date: Jul. 13, 1998
(87) PCT Pub. No.: WO98/03972
  PCT Pub. Date: Jan. 29, 1998

(30) Foreign Application Priority Data

| Jul. 22, 1996 | (JP) | 8-191889 |
| Mar. 27, 1997 | (JP) | 9-075703 |
| May 23, 1997 | (JP) | 9-133897 |
| May 14, 1997 | (JP) | 9-124257 |

(51) Int. Cl.$^7$ .............................................. G11B 5/86
(52) U.S. Cl. .................. 360/17; 360/17; 360/75; 360/135; 428/694 SG; 428/694 TR
(58) Field of Search .................. 360/17, 135, 55, 360/15, 75; 428/694 SG, 694 TR

(56) References Cited

U.S. PATENT DOCUMENTS

| 3,869,711 A | 3/1975 | Bernard et al. |
| 4,422,106 A | 12/1983 | Sawazaki |
| 4,525,828 A | 7/1985 | Higashiyama et al. |

(List continued on next page.)

FOREIGN PATENT DOCUMENTS

| EP | 0 131895 | 1/1985 |
| EP | 0 655 734 | 5/1995 |
| EP | 0 915 456 | 5/1999 |

(List continued on next page.)

OTHER PUBLICATIONS

Tanaka et al, Characterization of Magnetizing Process for Pre-Embossed Servo Pattern of Plastic Hard Disks, IEEE Transactions on Magnetics, pp. 4209-4211, Nov. 1994.*

C. Denis Mee et al. *Magnetic Recording* (vol. III: Video, Audio, and Instrumentation Recording), Chapter 2, pp. 94-105.

*Primary Examiner*—David Hudspeth
*Assistant Examiner*—Dan I. Davidson
(74) *Attorney, Agent, or Firm*—Merchant & Gould P.C.

(57) ABSTRACT

A master information carrier comprises a substrate whose surface has an embossed pattern corresponding to an information signal. At least a surface of the protruding portion of the embossed pattern is made of a ferromagnetic material. A method for writing an information signal into a sheet or disk magnetic record medium with a ferromagnetic thin film or coating is performed by putting the surface of the magnetic record medium into contact with the master information carrier so as to write a magnetized pattern corresponding to the embossed pattern of the master information carrier into the magnetic record medium.

16 Claims, 21 Drawing Sheets

U.S. PATENT DOCUMENTS

| | | | |
|---|---|---|---|
| 4,911,967 A | * 3/1990 | Lazzari | 428/64 |
| 4,912,585 A | 3/1990 | Belser et al. | |
| 5,296,995 A | 3/1994 | Yonezawa et al. | |
| 5,303,092 A | 4/1994 | Noda | |
| 5,585,989 A | 12/1996 | Kuromiya et al. | |
| 5,748,421 A | * 5/1998 | Taki et al. | 360/135 |
| 5,898,553 A | * 4/1999 | Oyanagi et al. | 360/135 |
| 5,991,104 A | * 11/1999 | Bonyhard | 360/15 |
| 6,088,200 A | * 7/2000 | Morita | 360/135 |

FOREIGN PATENT DOCUMENTS

| | | |
|---|---|---|
| GB | 2 164 483 | 3/1986 |
| JP | 49-5610 | 5/1972 |
| JP | 48-53704 | 7/1973 |
| JP | 51-25723 | 8/1976 |
| JP | 55-12545 | 1/1980 |
| JP | 55-70935 | 5/1980 |
| JP | 56-7243 | 1/1981 |
| JP | 56-22219 | 3/1981 |
| JP | 56-41528 | 4/1981 |
| JP | 57-8921 | 1/1982 |
| JP | 57-24032 | 2/1982 |
| JP | 57-109133 | 7/1982 |
| JP | 57-109134 | 7/1982 |
| JP | 57-158004 | 9/1982 |
| JP | 57-158038 | 9/1982 |
| JP | 57-158039 | 9/1982 |
| JP | 57-158040 | 9/1982 |
| JP | 57-158041 | 9/1982 |
| JP | 58-94136 | 6/1983 |
| JP | 58-94137 | 6/1983 |
| JP | 60-22733 | 2/1985 |
| JP | 60-209915 | 10/1985 |
| JP | 61-66215 | 4/1986 |
| JP | 61-190719 | 8/1986 |
| JP | 62-124622 | 6/1987 |
| JP | 62-264432 | 11/1987 |
| JP | 63-811 | 1/1988 |
| JP | 63-166023 | 7/1988 |
| JP | 63-183623 | 7/1988 |
| JP | 2-94111 | 4/1990 |
| JP | 2-98820 | 4/1990 |
| JP | 2-132630 | 5/1990 |
| JP | 2-214023 | 8/1990 |
| JP | 402301018 A * 12/1990 | 5/82 |
| JP | 3-256223 | 11/1991 |
| JP | 4-134629 | 5/1992 |
| JP | 4-251435 | 9/1992 |
| JP | 4-251440 | 9/1992 |
| JP | 7-44858 | 2/1995 |
| JP | 9-138927 | 5/1997 |
| JP | 10-40544 | 2/1998 |
| JP | 56-68926 | 6/1998 |
| JP | 10-162360 | 6/1998 |
| JP | 10-269566 | 10/1998 |
| JP | 10-275435 | 10/1998 |

* cited by examiner (a)

(b)

(c)

(a)

(b)

(c)

(a)

(b)

(c)

(d)

(a)

(b)

(c)

(d)

(a)

(b)

(c)

(a)

(b)

MASTER INFORMATION CARRIER, PROCESS FOR PRODUCING THE CARRIER, AND METHOD AND APPARATUS FOR RECORDING MASTER INFORMATION SIGNAL ON MAGNETIC RECORDING MEDIUM BY USING THE CARRIER

FIELD OF THE INVENTION

The present invention relates to a method and apparatus for recording information signals into a magnetic record medium used in a device for magnetic recording and reproduction with high recording density and large capacity, a master information carrier to be used for the recording method, and a method for making the master information carrier.

BACKGROUND OF THE INVENTION

Recently, a magnetic recording and reproduction apparatus has been increasing recording density to realize small size and large capacity. Especially, in the field of a hard disk as a typical magnetic recording device, an areal recording density of more than one gigabit per square inch is already available on the market, and an areal recording density of ten gigabits per square inch is expected in a couple of years. The technology proceeds with a rapid pace.

One of the primary factors that has enabled such high recording density is the increasing linear recording density, due to improvements of medium properties, head-disk interface performance, and new signal processing method such as "partial response". However, in recent years, the rate of increase in track density exceeds that of linear record density, and thus becomes a primary factor of the increasing areal recording density. Practical use of a magneto-resistive type head, which is superior to a conventional inductive type head in read-back signal performance, has contributed to the progress in the track density. It is possible at present to read a signal from a track whose width is only a few microns with good S/N ratio by practical use of the magneto-resistive type head. On the other hand, it is expected that a track pitch will reach the sub-micron range in the near future along with further improvement of the head performance.

A tracking servo technique is important for the head to read a signal with high S/N ratio by tracing such a narrow track. For example, a conventional hard disk has areas that are located at predetermined angles over 360 degree and in which information such as a tracking servo signal, address and clock signal are written. In this specification, preformat writing or prewriting of such an information signal is called a "preformat recording". A head can trace a track by reading such information in predetermined intervals, and monitoring and correcting the head position.

The above mentioned tracking servo signal, address and clock signal become reference signals for the head to trace a track precisely. Therefore, precise record positions are required for these information signals. Current preformat recording into a hard disk is usually performed by magnetic heads placed in the hard disk drive by using a special servo track writer after installing the disk and the head into the drive. In this case, a required accuracy of the track position for writing is achieved by precisely controlling the position of the head incorporated in the drive by using an external actuator equipped to the servo track writer.

Such a preformat recording of servo signal, address information and clock signal is performed similarly for large capacity flexible disks or disk cartridges, which are removable disk media seen in the market recently, by using a magnetic head and a servo writer. These media are removable, so they can be compatibly used by other drives. Therefore, it is not always required to perform the preformat writing by the heads of each drive after incorporating the heads into the drive though it is required for a normal hard disk. However, these removable disks are similar to normal hard disks from the viewpoint that the preformat writing is performed by precisely controlling the position of the head by using an external actuator equipped to the servo track writer.

However, in the present preformat recording of servo signal, address information and clock signal, there are the problems described below.

The first problem is that writing with the magnetic head is a linear recording relying on relative movement between the magnetic head and the recording medium. This means that a long period is required for preformat writing by the above-mentioned method, while precisely controlling the position of the magnetic head with a servo track writer. Moreover, because the servo writer is expensive, the cost for preformat writing is high.

This problem becomes even more serious as the areal recording density increases. This is not only caused by an increase of tracks in radial direction. As the track density increases, a higher precision is required for the head positioning and as a result, servo areas, in which the tracking servo signal and other signals are recorded, have to be provided with smaller angular distances between them over 360 degrees. Moreover, the address information to be written as the preformat data increases as the recording density increases. Thus more time and cost are required for writing more information signals as the record density becomes higher.

A smaller size for magnetic disks is expected to be the trend on the market. However, large disks of 3.5 or 5 inch size are still in demand. These large disks require more information signals to be written for the preformat than the small disks. The necessary time for preformat writing influences the cost effectiveness of such large disks.

The second problem is that a space between the head and a medium or a diffusive recording magnetic field due to a pole shape of the record head does not make a steep magnetic transition at track edges where the preformat data is written. Relative movement between the magnetic head and a medium is indispensable in writing with the head, so some space is necessary between the head and the medium for interface performance between them. A conventional magnetic head usually has two elements for writing and reading. A pole width at a trailing edge of the head corresponds to a record track width, and a pole width at a leading edge is several times larger than that at the trailing edge.

The above two phenomena may be a factor for causing the diffusive recording magnetic field to fringe over the preformatted record track width, resulting in the magnetic transition at track edges not being steep or erased areas appearing on both sides of a track. In current tracking servo techniques, the head position is detected by a change in read signal amplitude when the head misses a track. Therefore, as in the process of reproducing the data signal recorded between the servo tracks, the system requires not only a high S/N ratio of a read signal when the head traces a track correctly, but also a steep off-track performance, in which the read signal amplitude changes steeply as the head misses the track. If the magnetic transition is not steep enough at an edge of a track where the preformat is written, it is difficult to realize a precise tracking servo performance that will be required for a submicron track recording in the future.

As a solution of the first of the two problems mentioned above, a duplicate record technique of a tracking servo signal or other signals by using a magnetic transfer technique has been disclosed in Japanese Publication of Unexamined Patent Application (Tokukai) Sho63-183623. The duplicate record technique of a magnetized pattern using the magnetic transfer technique was originally developed as a method for copying the contents of a videotape. This technique is explained in detail in C. D. Mee and E. D. Daniel, "Magnetic Recording", Vol. 3, Chapter 2, p94–105, for example. The method disclosed in Tokukai Sho63-183623 applies the above duplication technique for videotape to the preformat writing of the tracking servo signal or other signals for a flexible disk.

Such a magnetic transfer technique may improve the productivity of the preformat writing. However, this technique is effective only for media such as flexible disks that have a small coercive force and a low areal record density. It is not effective for today's hard disks, which have a large coercive force and a high areal record density in the order of several hundred megabits to gigabit.

In the magnetic transfer technique, an alternating bias magnetic field has to be applied, whose amplitude is approximately 1.5 times the coercive force of the target (slave) disk to ensure high transfer efficiency. The coercive force of the master disk should be more than three times of that of the slave disk, so that the master information, i.e. a magnetized pattern in the master disk, is not erased by the alternating bias magnetic field. Today's high-density hard disk media have a coercive force of 120–200 kA/m to enable a high-areal recording density. It is estimated that the coercive force will reach 250–350 kA/m for an areal record density of 10 gigabit order in the future. This means that a master disk should have a very large coercive force of 360–600 kA/m at present and 750–1050 kA/m in the future.

It is difficult to realize such a large coercive force for a master disk from the standpoint of a magnetic material. In addition, master information cannot be written into a master disk having such a large coercive force by any current magnetic recording method. Therefore, considering a possible coercive force for a master disk in the current magnetic transfer technique, the coercive force of the slave disk inevitably has an upper limit.

In the above-mentioned magnetic transfer technique, it is possible to utilize a thermo-magnetic transfer technique, where instead of applying the alternating bias magnetic field to the slave disk, the slave disk is heated to the temperature near to the Curie temperature for eliminating spontaneous magnetization. However, in that case, the Curie temperature of the slave disk should be much lower than that of the master disk. High coercive force magnetic film composed of Co group materials used for a high density magnetic record medium has a relatively high Curie temperature, so it is difficult to realize the characteristics required of the master disk and the slave disk for the thermo-magnetic transfer. Therefore, this preformat writing with a magnetic transfer technique cannot be a substantial solution for the before-mentioned problems.

Another solution for these problems is a pre-embossed disk technique disclosed in Publication of Japanese Unexamined Patent Application (Tokukai) Hei7-153060 (corresponding to U.S. Pat. No. 5,585,989 and European laid open patent application Ser. No. 655,734). In this technique, an embossed pattern corresponding to a tracking servo signal, address, clock signal and/or other signals is formed on a surface of the disk substrate by a stamper, and a magnetic film is formed on the substrate. This technique can be an effective solution for the before-mentioned problems. However, the embossed pattern on the disk surface may influence the head's flying float performance (or contact state in the case of contact writing) when writing or reading, so that interface performance between the head and medium may be problematic. In addition, the substrate processed by the stamper is usually a polymer material (plastic), so it cannot be heated when forming the magnetic film for ensuring medium properties, and thus a necessary S/N ratio cannot be ensured.

As mentioned above, a truly effective solution of the before-mentioned two problems, which does not sacrifice other important performance such as the medium S/N ratio or the head-medium interface, has not been found yet.

SUMMARY OF THE INVENTION

Considering the above problems, the present invention provides a method and apparatus for improving the productivity of the preformat writing and the sharpness of the magnetic transition at edges of a track where the preformat is written, without sacrificing other important performance criteria such as the S/N ratio or the head-medium interface.

A method for writing a master information signal into a magnetic record medium according to the present invention uses a master information carrier comprising a substrate; an embossed pattern corresponding to the master information signal formed on the substrate; and a ferromagnetic material that forms at least the surface of the protruding portion of the embossed pattern. The surface of this master information carrier contacts with a surface of a target magnetic record medium having a sheet or disk shape, whose surface has a ferromagnetic thin film or coating. Thus, a magnetized pattern corresponding to the embossed pattern on the surface of the master information carrier is recorded into the magnetic record medium.

It is preferable that the ferromagnetic material forming the surface of the protruding portion is a soft magnetic material. Alternatively, it can be a hard or semihard magnetic material whose coercive force is less than 40 kA/m in the in-plane or perpendicular direction of the substrate.

It is more preferable to apply a direct (i.e., not alternating) magnetic field for exciting the ferromagnetic material forming the surface of the protruding portion, or an alternating magnetic field for assisting the writing of the magnetizing pattern, when the surface of the master information carrier contacts with the surface of the magnetic record medium.

According to the above-mentioned method of the present invention, a leakage flux is generated from the ferromagnetic material at the protruding portion of the surface of the master information carrier when the ferromagnetic material is magnetized in one direction. This leakage flux performs writing of the magnetized pattern corresponding to the embossed pattern of the master information carrier into the magnetic record medium. Thus, the preformat writing of the tracking servo signal, address signal, clock signal and other signals is achieved by using the embossed pattern formed on the surface of the master information carrier, corresponding to the information signal.

The writing method of the present invention utilizes a leakage magnetic field generated from the ferromagnetic material at the protruding portion due to the change of the magnetic reluctance through the embossed pattern. Therefore, the writing mechanism is the same as a conventional magnetic record utilizing a leakage magnetic field generated from a gap of the magnetic head. However, in the writing method of the present invention, the master information of the whole plane of the master information carrier is written into the magnetic record medium at one time without relative movement between the master information carrier and the record medium. This characteristic point differs from the writing with magnetic head in the prior art, in which the head and the record medium move relative to each other. This characteristic point of the present invention provides an effective solution for the previously mentioned two problems, as follows.

First, the time needed for the preformat writing is substantially short compared with the prior art using a magnetic head. In addition, an expensive servo-tracking writer is not necessary for precise position control of the magnetic head. Therefore, the present invention can improve the productivity of the preformat writing and reduce production costs.

Secondly, a space gap between the master information carrier and the magnetic record medium can be minimized, since relative movement between them is not required for writing the information signal. In addition, the leakage magnetic field for writing does not diffuse, while it diffuses fringing over the record track width in the prior art using a magnetic head due to a pole shape of the magnetic head. Thus the magnetic transition at edges of a track into which the preformat data is written has sharpness compared with the writing with a magnetic head. This ensures a precise tracking of a head in reading data signals from the magnetic record medium.

Furthermore, the method of the present invention does not require the limitation of a structure or magnetic performance of the magnetic record medium in which the master information is written, differently from the magnetic transfer technique disclosed in Tokukai Sho63-183623 or the pre-embossed disk technique disclosed in Tokukai Hei7-153060 as previously stated.

For example, in the magnetic transfer technique disclosed in Tokukai Sho63-183623, the master disk requires a substantially high record resolution, since the master disk itself is a magnetic record medium having master information as a magnetization pattern of the master disk. Consequently, the magnetic flux density and the film thickness cannot be enhanced sufficiently for enlarging magnetic field intensity for magnetic transfer. In addition, a gradient of the magnetic field for the magnetic transfer becomes small in the magnetic transition area since demagnetization occurs due to the repelling poles of the di-bit. To ensure a sufficient magnetic transfer efficiency with such a weak magnetic field for magnetic transfer, an alternating bias magnetic field is applied, which has an intensity of approximately 1.5 times of a coercive force of the target (slave) record disk. Therefore, this magnetic transfer technique can be applied only to a flexible disk or other medium with low record density since the coercive force is limited as previously stated.

On the contrary, the master information carrier of the present invention has the master information as an embossed pattern, and a leakage magnetic field, which is generated from a ferromagnetic material at a protruding portion of the embossed pattern due to a change of a magnetic reluctance through the embossed pattern, performs the magnetic recording of the master information. The master information carrier does not require a high resolution as the magnetic record medium, though it is required for the master disk in the magnetic transfer technique. Therefore a magnetic flux density and a thickness of the ferromagnetic material that forms the protruding portion of the surface of the master information carrier can be as large as the magnetic record head used in the prior art, so that a sharp and large recording magnetic field can be obtained similarly to a magnetic record head. Thus, a sufficient writing ability can be obtained for any magnetic record medium, including a usual flexible disk and hard disk and a record medium with a high coercive force for a gigabit recording in the future.

The pre-embossed disk technique disclosed in Tokukai Hei7-153060 may require a sacrifice of the medium S/N ratio relating to a substrate temperature at film formation process and the head-medium interface performance relating to a head floating performance (or contacting state), since the substrate material and shape of the disk are restricted as previously explained. On the contrary, the writing method of the present invention has no limitation about the substrate material and surface shape of the disk to be written for the preformat.

As mentioned above, the writing method of the present invention provides an essential solution for the previously mentioned two problems without sacrificing other important performances such as the medium S/N ratio and interface performance.

It is also effective in this writing method to apply an alternating and decaying bias magnetic field for obtaining higher writing efficiency. In this case, there is no possibility of erasing a master information by the alternating magnetic field or other external magnetic field since the master information is formed by the embossing pattern in the master information carrier of the present invention differently from the master information written as a magnetization pattern in the magnetic transfer technique. Therefore, the coercive force of the ferromagnetic material that forms the protruding portion of the surface of the master information carrier has no limitation. The ferromagnetic material is not limited to a material with high coercive force, but can be selected from a variety of materials such as a semihard magnetic material or a soft magnetic material as long as the material can generate sufficient magnetic field for writing the master information into a magnetic record medium.

In the writing method of the present invention, the ferromagnetic material that forms the protruding portion of the surface of the master information carrier should be magnetized in one direction to generate a magnetic field for writing. Therefore, if the semihard or soft magnetic material used as the ferromagnetic material cannot generate a stable one-way magnetization, or if a large amplitude of alternating bias magnetic field is applied, it is necessary to apply a direct exciting field for exciting the ferromagnetic material and generating an adequate intensity of magnetic field for writing. This direct (not alternating) magnetic field corresponds to the magnetic field generated by a drive current in wiring coils of a magnetic head.

As mentioned above, the present invention provides a method for preformat writing of a tracking servo signal, address signal, clock signal or other signals into a magnetic record medium, especially a disk medium such as a hard disk or a large capacity flexible disk, with substantially high productivity and low cost.

The present invention also provides more precise tracking for a higher track density than in the prior art.

The present invention provides an essential solution for the previously stated problems in the prior art without sacrificing any important performances such as a medium S/N ratio or a head-medium interface performance. Thus, the present invention will be an important technology for a magnetic record medium with a high record density of gigabit order and above in the future.

DETAILED DESCRIPTION OF THE PREFERRED EMBODIMENTS

Below, the preferred embodiments of the present invention are explained in detail with reference to the accompanying drawings.

(First Embodiment)

The following explanation concerns a basic configuration of the master information carrier according to the present invention and the method for writing the master information signal into a magnetic record medium using the master information carrier.

Figure 1:
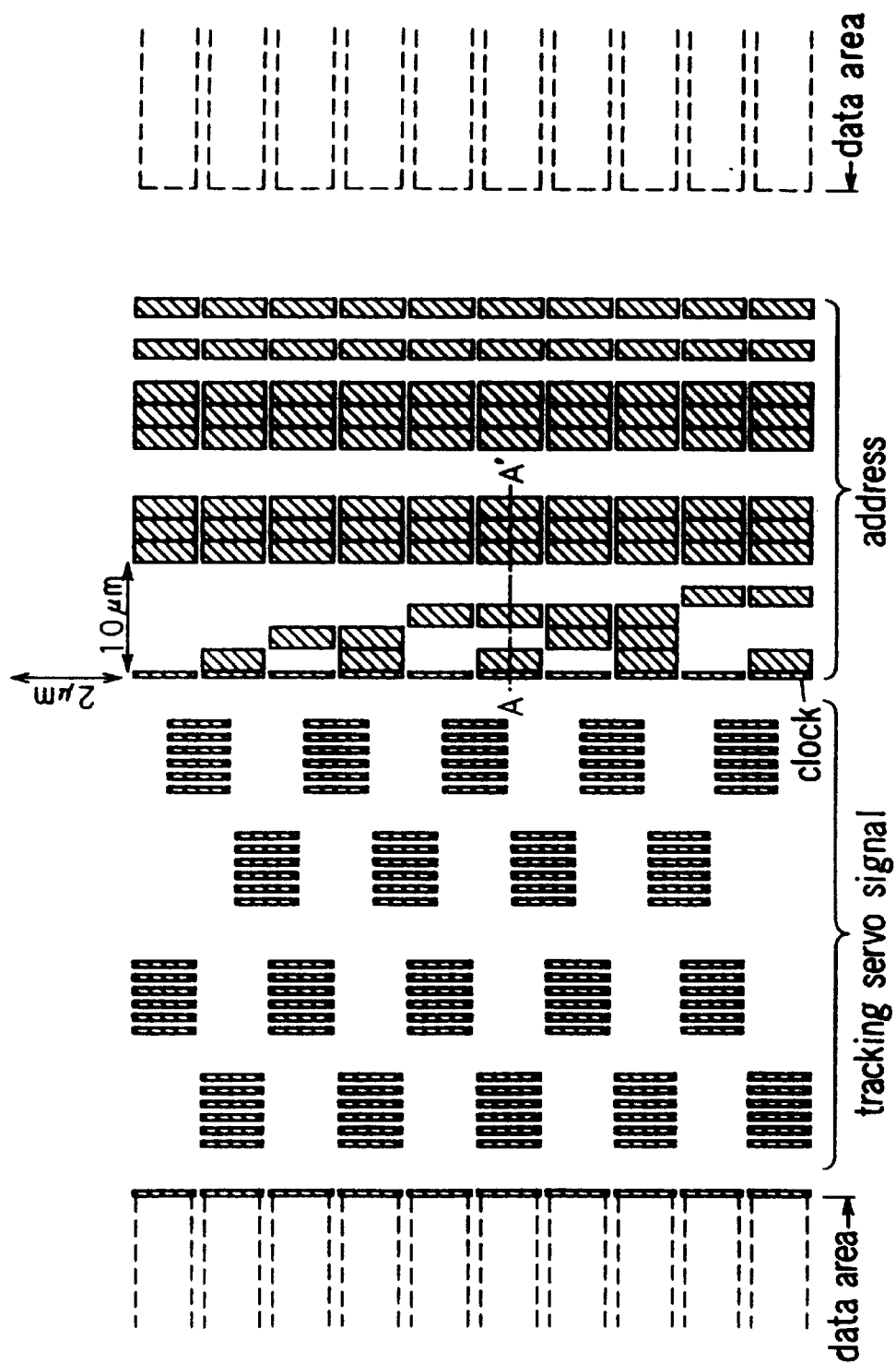
FIG. 1 is an enlarged plan view showing an example of a surface of a master information carrier according to the present invention.

FIG. 1 shows an example of a surface of a master information carrier according to the present invention. FIG. 1 shows a master information pattern to be written in a preformat area that is disposed at a given predetermined angular distance along circumferential direction (i.e. the track direction) for ten tracks in radial direction (i.e. in the direction traversing the track) of the disk. In FIG. 1, areas defined by broken lines correspond to tracks to be used as data areas in the magnetic record medium after writing the master information signal. In a real master information carrier surface, such master information patterns as shown in FIG. 1 are formed at a predetermined angular distance in circumferential direction and in all tracks over the whole recording area of the magnetic record disk in radial direction.

The master information pattern comprises a tracking servo signal area, a clock signal area and address signal area that are disposed sequentially along the track direction as shown e.g. in FIG. 1. The surface of the master information carrier according to the present invention has an embossed pattern corresponding to this master information pattern. Each hatched portion in FIG. 1, for example, is a protruding portion whose surface is made of a ferromagnetic material. It is preferable to use a ferromagnetic thin film formed by vapor deposition or a plating method as the ferromagnetic material. However, a magnetic coating layer that contains magnetic particles dispersed in an organic binder, or a bulk material such as sintered material can be used, too.

The fine embossed pattern corresponding to the information signal as shown in FIG. 1 can be formed easily by utilizing a variety of fine processing technique such as a master stamper process for an optical disk or a semiconductor process. For example, such a process comprises the steps of forming a resist film on a ferromagnetic film, patterning by exposure and development with a photolithography technique or a lithography technique using laser or electron beams, and dry etching to make a fine embossed pattern on the ferromagnetic film. Alternatively, it may comprise the steps of patterning a resist film on a substrate, forming a ferromagnetic film, and removing the resist film to make a fine embossed pattern by the ferromagnetic film. This process is called liftoff method. It is possible to make the fine embossed pattern without using a resist film by a direct fine process using a laser, electron beam, ion beam, or other machining, as long as the fine embossed pattern corresponding to the information signal is formed with a high precision. Some examples of fine processes that are suited for making the master information carrier of the present invention will be explained in detail under the Second Embodiment.

Figure 2:
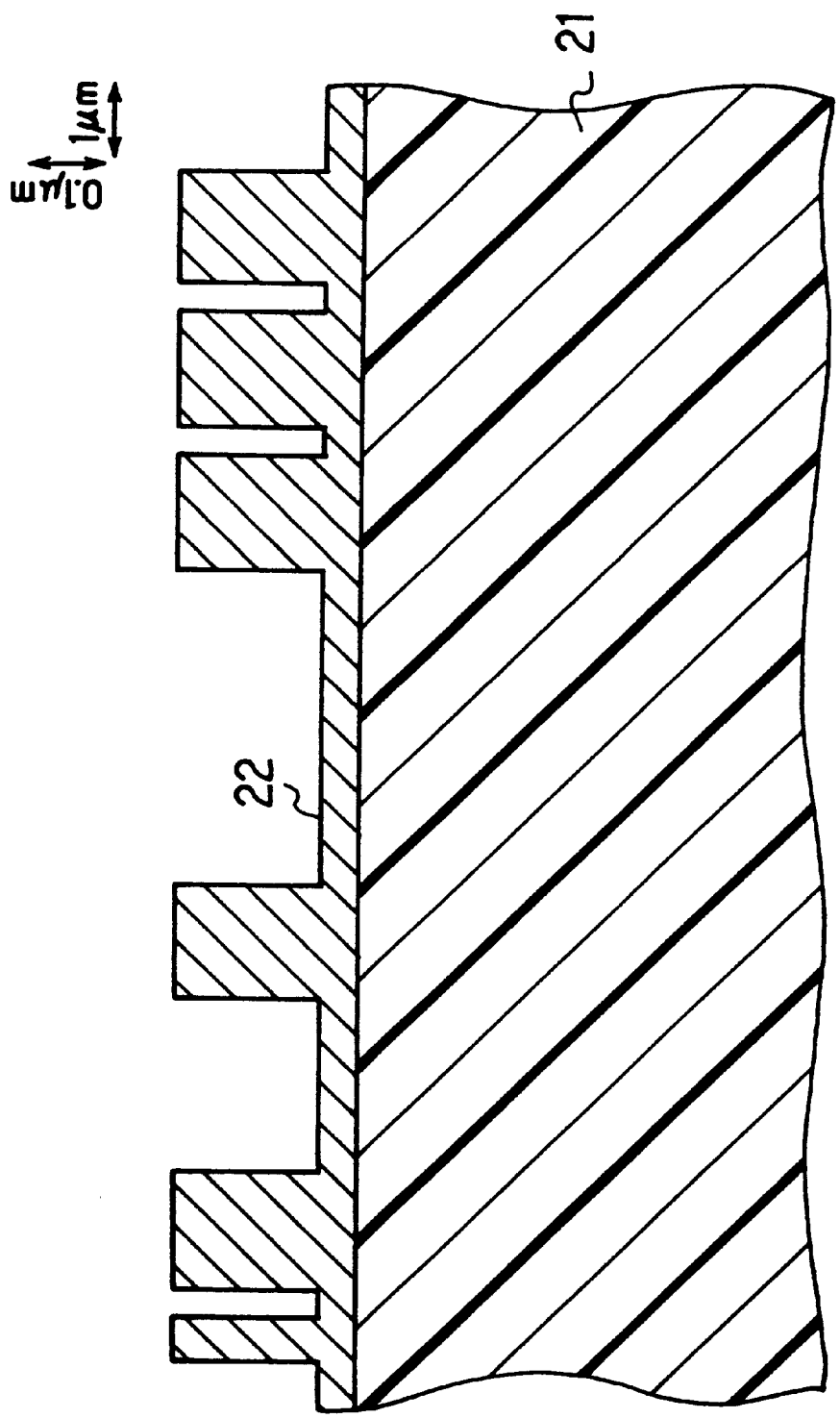
FIG. 2 shows an example of the master information carrier according to the present invention in a cross section along a track.
Figure 3:
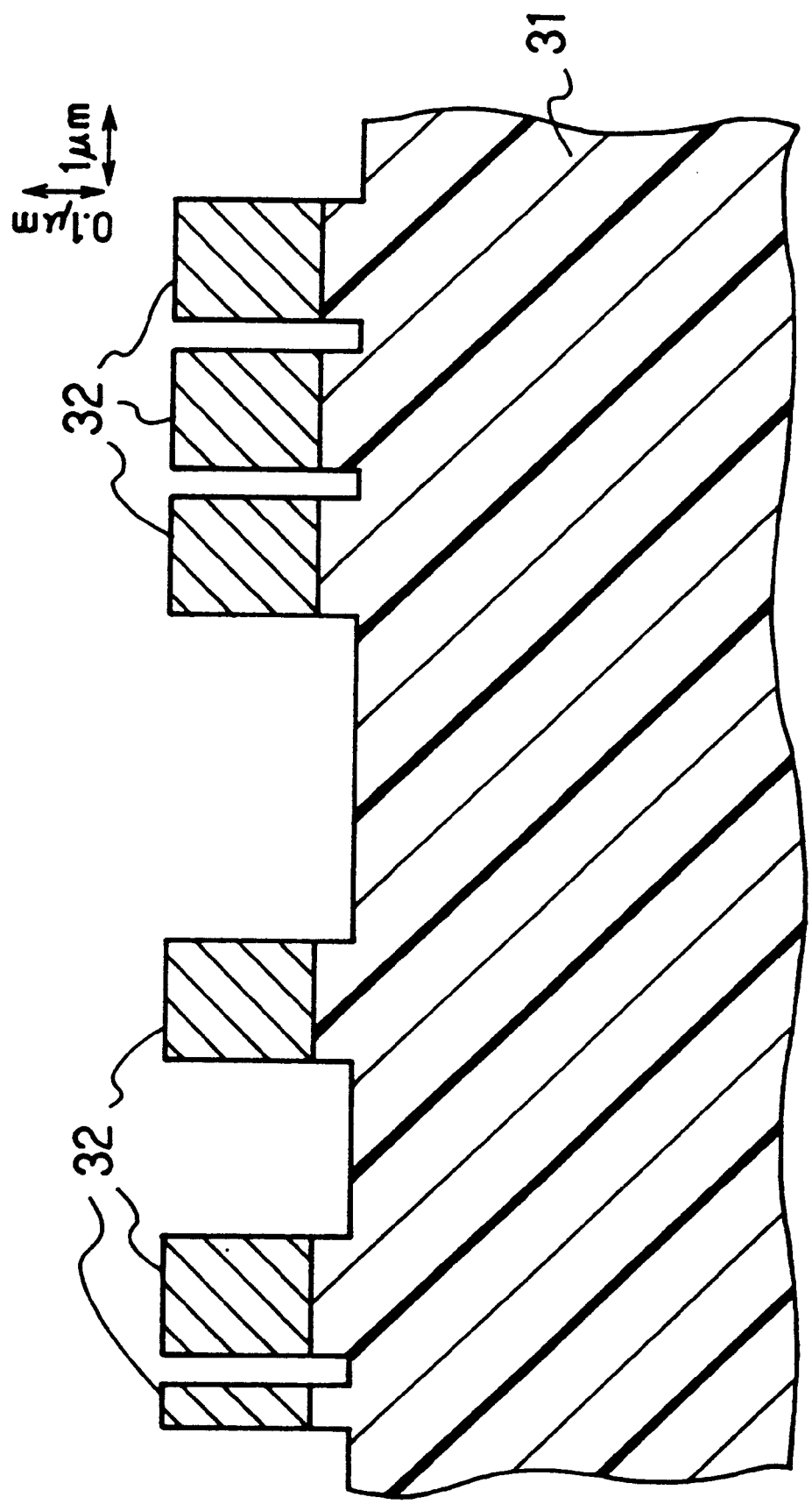
FIG. 3 shows another example of the master information carrier according to the present invention in a cross section along a track.
Figure 4:
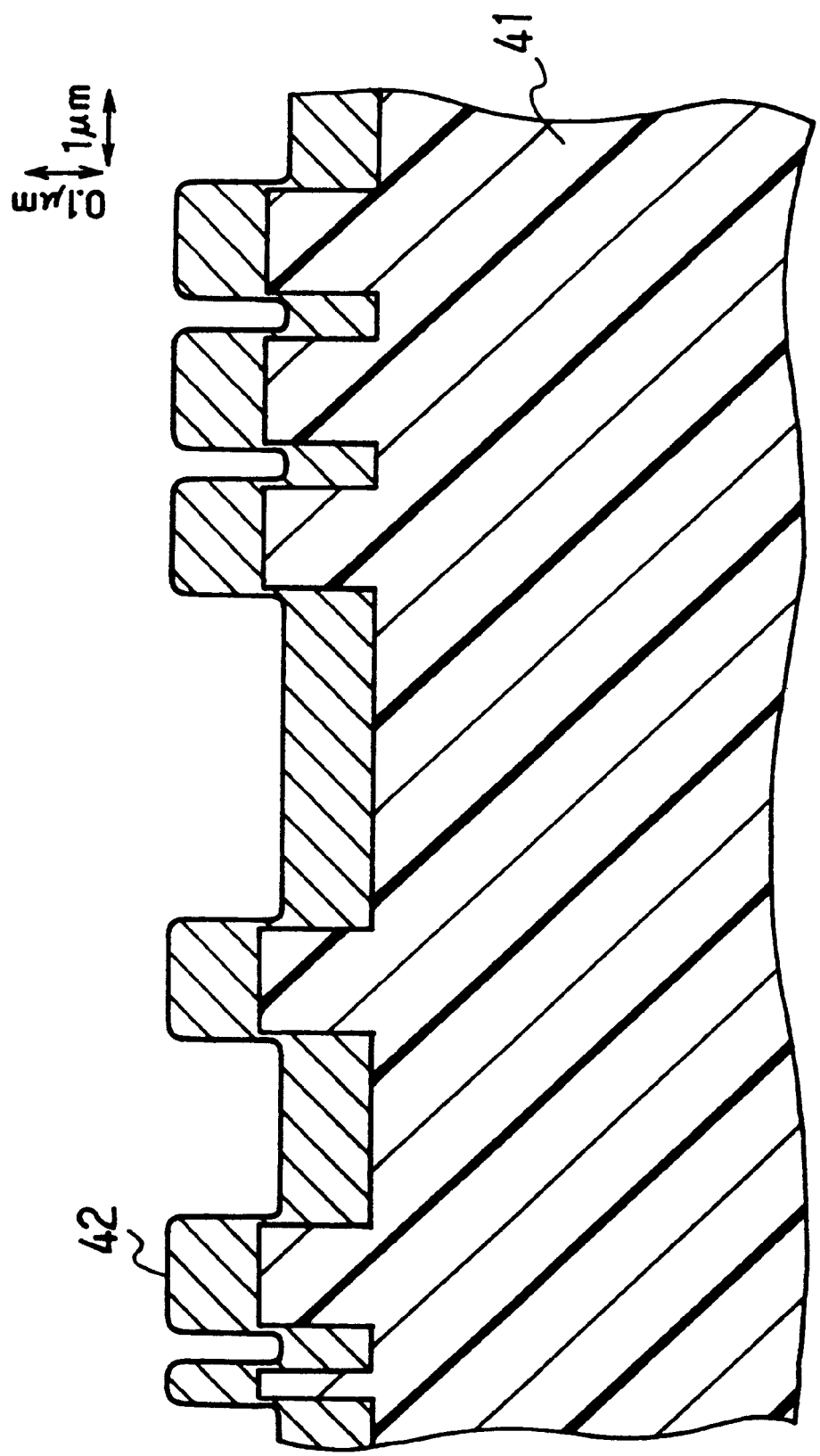
FIG. 4 shows yet another example of the master information carrier according to the present invention in a cross section along a track.

FIGS. 2–4 show examples of a cross section of the master information carrier shown in FIG. 1 along phantom line A—A'. FIGS. 2 and 3 show examples whose embossed pattern corresponding to the master information is formed after forming ferromagnetic film 22, 32 on planar substrate 21, 31. The ferromagnetic film 22 in FIG. 2 remains at the bottom portion as well as the protruding portion of the embossed pattern. On the other hand, the ferromagnetic film 32 in FIG. 3 remains only at the protruding portion of the embossed pattern as the bottom portion is in the substrate 31. Both examples are acceptable.

In the example of FIG. 4, ferromagnetic film 42 is formed after making an embossed pattern in the surface of the substrate 41. This example may have a disadvantage in that edges of the surface of the ferromagnetic film 42 at the protruding portion have a tendency to be round, so a sharp step may not be obtained. In this case, during the writing of master information on the magnetic disk medium, the gradient of the magnetic field at a boundary between the protruding portion and the bottom portion may be decreased and deterioration of writing performance may occur.

On the other hand, the configuration of FIG. 2 or 3 is generally preferable compared with that of FIG. 4 since the magnetic field for writing may have a sufficiently large gradient at the boundary between the protruding portion and the bottom portion. However, it is necessary to be careful so that a resist layer or deteriorated layer is completely removed from the surface of the ferromagnetic film after making the embossed pattern. Otherwise, the remaining substances may cause spacing loss in the writing process of master information onto the magnetic disk medium.

Concerning the material of the substrate, there is no limitation as long as the ferromagnetic film can be formed on the substrate and the fine embossed pattern can be processed precisely corresponding to the master information signal. However, it is better to use a material whose surface-roughness is small and which has excellent flatness. If the surface of the substrate is rough, the surface of the ferromagnetic film formed on the substrate may be rough too, and a write-spacing loss may increase when writing the master information into the magnetic disk. As a material having a small surface-roughness, a variety of glasses used for magnetic disks or optical disks, polymeric material such as a polycarbonate, metals such as Al, Si substrates, or carbon can be used.

Concerning the above mentioned write-spacing loss, it is preferable that the surface of the master information carrier and the surface of the magnetic disk contact with each other securely when the master information is written into the magnetic disk. Especially if the magnetic record disk into which the master information is written is a hard disk, the surface of the master information carrier preferably is able to compensate a fine wimple or bending of the hard disk to realize a secure contact state over the whole disk surface. Therefore, a material having some flexibility, for example a sheet or disk made of polymer or thin metal is preferable as the substrate material for the master information carrier.

From this viewpoint, an example of the master information carrier having a preferred substrate will be explained later in Third Embodiment.

A depth of the bottom of the embossed pattern, that is the distance between the surface of the protruding portion and the bottom, is usually set at more than 0.05 microns, preferably more than 0.1 microns, though it depends on the surface condition of the magnetic disk medium in which the master information is written or the bit size of the master information. If the ferromagnetic material remains at the bottom of the embossed pattern as shown in FIG. 2 or 4, the depth of the bottom below 0.1 microns may result in an insufficient gradient of the magnetic field for writing. The depth of the bottom above 0.1 microns is preferable also for maintaining the secure contact state between the surface of the master information carrier and the surface of the magnetic disk when the master information is written onto the magnetic disk.

The ferromagnetic film can be formed by a usual method for forming a thin film, such as sputtering, vacuum vapor deposition, plating, or chemical vapor deposition (CVD).

A variety of materials can be used for forming the ferromagnetic film, such as a hard magnetic material, semi-hard magnetic material or soft magnetic material as explained previously. However, it is better that the saturation magnetic flux density of the material is large to generate a sufficient magnetic field for writing regardless of a kind of the magnetic disk into which the master information is written. Especially, when writing into a disk with a high coercive force above 150 kA/m or a flexible disk with a thicker magnetic layer, a material with a saturation magnetic flux density above 0.8 T, preferably above 1.0 T, is used generally. Otherwise the writing cannot be performed sufficiently.

Furthermore, the thickness of the ferromagnetic film also influences the writing ability into the magnetic disk. A certain thickness of the ferromagnetic film is necessary to generate a sufficient magnetic field for writing regardless of a kind of the magnetic disk, though, on the other hand, the influence of a demagnetizing field due to the bit shape of the master information should be taken into consideration. In the configuration of the present invention, the ferromagnetic film of the protruding portion of the master information disk is magnetized along the track direction in the film plane for generating the magnetic field for writing, except for the special case where the magnetic disk is a perpendicular magnetic record medium or other special cases. However, if the thickness of the ferromagnetic film is too large, the writing ability is decreased since the leakage flux decreases by the influence of the demagnetizing field. Therefore, the thickness of the ferromagnetic film should be set at an adequate value depending on the bit length of the master information. For example, if the least bit length of the master information is 1–2 micron, the adequate thickness of the ferromagnetic film may be 0.1–1.0 micron.

Preferred magnetic characteristics of these ferromagnetic materials will be explained later together with a method for writing the master information into the magnetic disk.

Figure 5:
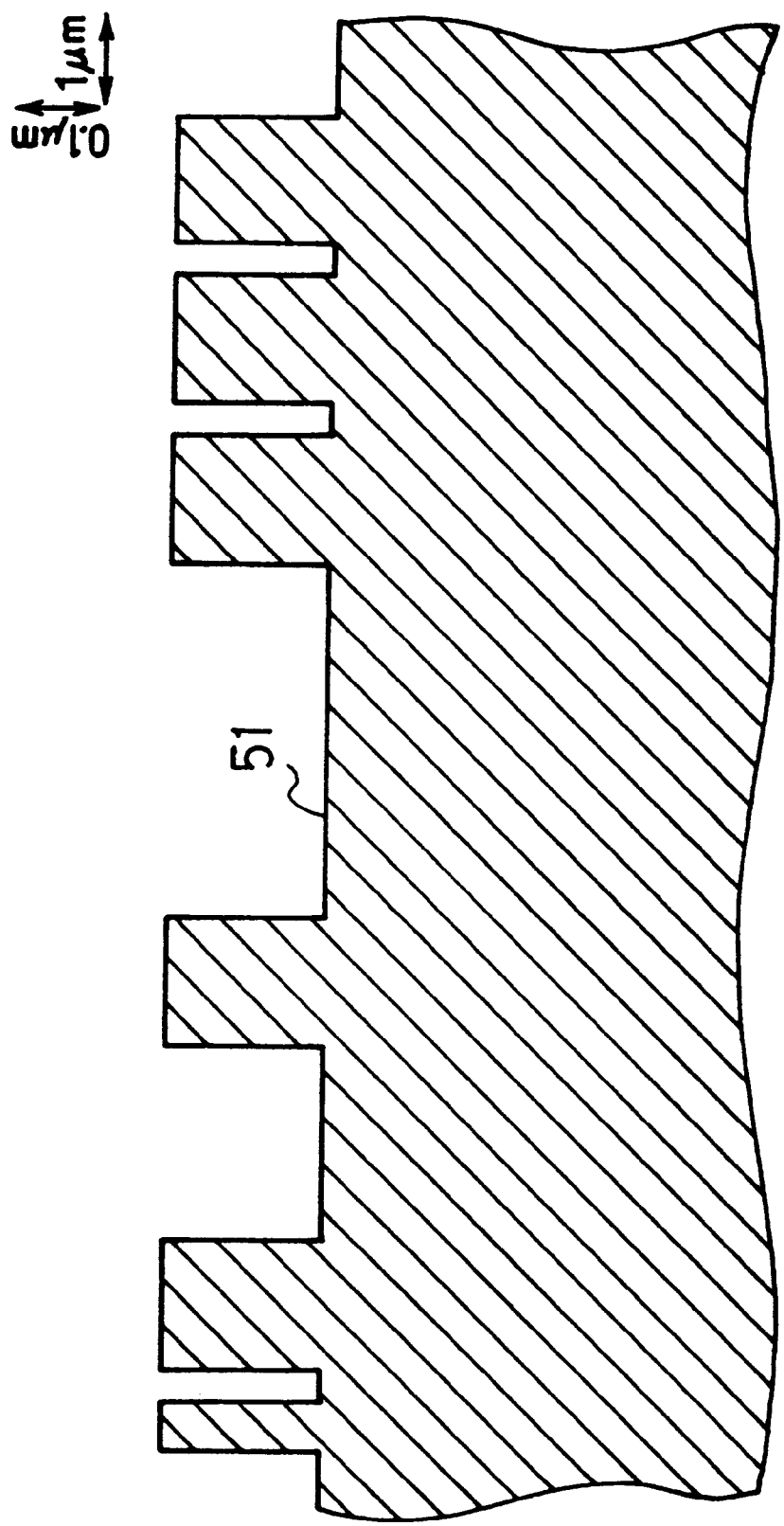
FIG. 5 shows yet another example of the master information carrier according to the present invention in a cross section along a track.

FIG. 5 shows another example of the cross section of the master information carrier along the phantom line A—A' in FIG. 1. This example in FIG. 5 differs from the examples shown in FIGS. 2–4 in that the substrate itself is made of the ferromagnetic material. In other words, a film formation step is not necessary in this example since the embossed pattern corresponding to the master information is formed on the surface of the substrate 51 made of the ferromagnetic material. Thus, the productivity for making the master information carrier is improved compared to FIGS. 2–4.

If a bulk material such as a sintered material is used for the ferromagnetic substrate 51, the surface-roughness of the master information carrier may be large. In this case, the write spacing may increase when writing the master information onto the magnetic disk, so the substrate material chosen should have a surface as smooth as possible. Generally, a bulk material such as a sintered material does not have flexibility, so the example in FIG. 5 is more suitable for writing into a flexible disk rather than a hard disk.

A method for writing the master information signal into the magnetic disk using the above-mentioned master information carrier is explained in the following. FIG. 6(*a*) shows the method for writing the master information into the in-plane magnetic record medium. FIG. 6(*b*) shows a magnetization pattern that was written into the magnetic record medium. FIG. 6(*c*) shows an example of a read-back signal of the above written magnetization pattern detected by a magnetoresistive (MR) type head. FIGS. 6(*a*) and 6(*b*) are both the cross sections of the magnetic record medium along the track direction.

Figure 6A:
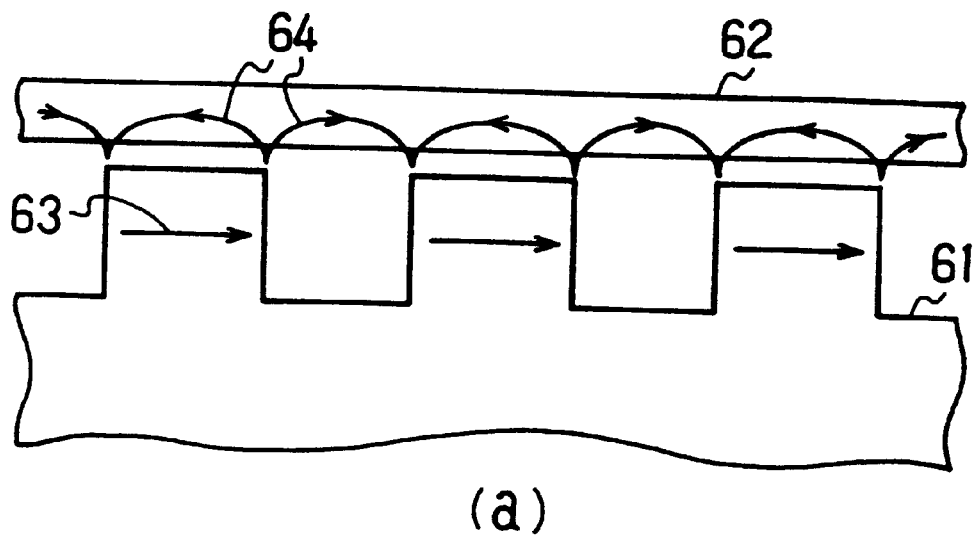
FIG. 6(a) shows a method for writing master information into a magnetic record medium using a master information carrier according to the present invention.

When writing onto the in-plane magnetic record medium, the ferromagnetic material that forms the protruding portion of the master information carrier 61 is magnetized in the direction 63, along a track parallel to the surface of the magnetic record medium 62, as shown in FIG. 6A. This magnetization 63 is given by residual magnetization generated by previously saturating the ferromagnetic material that forms the protruding portion along the track direction, e.g. if the ferromagnetic material of the protruding portions is a highly coercive material. Materials composed of rare earth elements and transition metal material such as Sm—Co or Ne—Fe—B are suitable as highly coercive material for the above mentioned ferromagnetic material since they have a high coercive force and high saturation flux density.

The surface of the master information carrier 61 causes a change of the magnetic reluctance due to the embossed pattern. Thus, the magnetization 63 of the ferromagnetic material at the protruding portion generates the magnetic field 64 for writing. This magnetic field 64 has opposite polarities for the surfaces of the protruding portion and the bottom of the master information carrier 61. Consequently, the magnetization pattern 65 shown in FIG. 6(*b*) is written into the magnetic record medium 62, corresponding to the embossed pattern.

The read signal waveform is shown in FIG. 6(*c*), which is read using a magnetic head and attained from the magnetization 65 recorded by the method of the present invention. The waveform shown in FIG. 6(*c*) is basically similar to that of the signal read from the magnetization recorded by the method in the prior art using a magnetic head. Therefore, there is no problem in processing the read signal. The writing method of the present invention is rather superior regarding the symmetry of the read signal to the method using a magnetic head, probably because the method of the present invention is not accompanied by relative movement of the master information carrier and the magnetic record medium.

In the writing step according to the present invention, applying an alternating and decaying bias magnetic field improves the efficiency of writing, as explained before. Considering the technical field of the invention, it is preferable to utilize a basically digital saturation recording in the writing process of the present invention. However, there may be some cases with insufficient writing ability depending on the information signal pattern to be written or the magnetic characteristics of the magnetic record medium. In these cases, applying the alternating and decaying bias magnetic field will be effective means to obtain a sufficient saturation writing.

A writing mechanism with applying the alternating bias magnetic field is basically the same as an analog alternating bias writing in the prior art. However, the recording method of the present invention is a static recording without relative movement between the master information carrier and the magnetic recording medium. Therefore, a frequency of the alternating bias magnetic field is not as limited as the analog alternating bias writing in the prior art. The frequency of the alternating magnetic field to be applied in the method of the present invention can be 50 or 60 Hz, as is used for commercial AC power supply.

A decay time of the alternating bias magnetic field is set substantially longer than a period of the alternating bias magnetic field, preferably more than five periods. For example, if the frequency of the alternating bias magnetic field is 50 or 60 Hz, more than 100 ms may be enough for the decay time.

On the other hand, the method shown in FIG. 6(*a*) requires a maximum amplitude of the alternating magnetic field that is less than a coercive force of the ferromagnetic material that forms the protruding portion of the master information carrier 61. In the method shown in FIG. 6(*a*), applying an alternating bias magnetic field greater than the coercive force of the ferromagnetic material will decrease the magnetization 63 of the magnetic material of the protruding portion. In this case, it is difficult to obtain a sufficient magnetic field 64 for writing.

In the above explanation, a highly coercive material is used for the ferromagnetic material that forms the protruding portion of the master information carrier. However, there are some cases where it is difficult to get a sufficient magnetization with an easy magnetization direction set along a track, owing to the embossed pattern formed on the surface of the master information carrier when using a highly coercive material.

For example, if a bit shape of the master information signal is elongated in the direction across the tracks, the ferromagnetic material that forms the protruding portion of the master information carrier is influenced by shape anisotropy in the direction across tracks so that the direction across the tracks tends to be an easy axis. In this case, the residual magnetization generated by saturating the ferromagnetic material along the track is too small to obtain a magnetic field along the track for writing. In addition, a hard magnetic highly coercive material usually has difficulty in controlling magnetic anisotropy. Therefore, it is difficult to induce the anisotropy that is enough to compensate the contribution of the above mentioned bit shape, in the direction along the track.

To solve the above-mentioned problem, it is preferable to make the ferromagnetic material that forms the protruding portion of the master information carrier using a soft magnetic material or a hard or semihard magnetic material having lower coercive force. There is no specific boundary between a hard magnetic material and a semihard magnetic material. In this specification, the term "semihard magnetic material" is used as a generic term for hard or semihard magnetic materials having a small coercive force (below 60 kA/m for example), that is less than a half value of a usual magnetic record medium (120–200 kA/m).

Such a soft or semihard magnetic material can be treated easily to have an adequate anisotropy by adding a variety of energies in the process of making the material or annealing the material in the magnetic field, compared with a hard magnetic material having a highly coercive force. Therefore, the above mentioned anisotropy due to the bit shape may be compensated easily, too. Furthermore, many soft or semi-hard materials have a large saturation flux density suitable for the ferromagnetic material that forms the protruding portion of the master information carrier. As the soft magnetic material suitable for the ferromagnetic material that forms the protruding portion of the master information carrier of the present invention there are, for example, a crystalline material such as Ni—Fe or Fe—Al—Si, an amorphous material of the Co group such as Co—Zr—Nb, or an Fe microcrystalline material such as Fe—Ta—N. For the semihard magnetic material having a low coercive force, for example, Fe, Co, Fe—Co and other materials are suitable.

Though the ferromagnetic material that forms the protruding portion of the master information carrier in the present invention should be magnetized in one direction to generate a magnetic field for writing in a writing process, a soft magnetic material or a semihard magnetic material usually does not provide a stable one-direction magnetization in a residual magnetization state. Therefore, in many cases, a direct exciting field is applied for exciting the material to generate an adequate magnetic field for writing. As mentioned before, this direct exciting field corresponds to a magnetic field generated by a current that flows in coil windings of the magnetic head.

Figure 7:
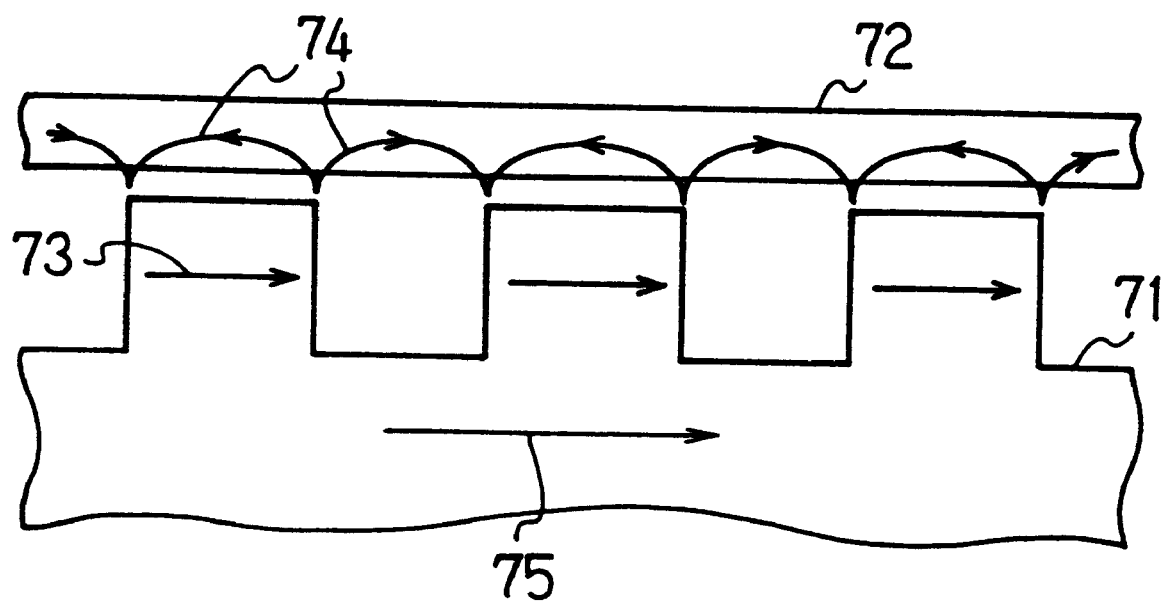
FIG. 7 shows another method for writing master information into a magnetic record medium using a master information carrier according to the present invention.

FIG. 7 shows the method for writing the master information signal using a direct magnetizing field as mentioned above. FIG. 7 is also the cross section along the track of the magnetic record medium similar to FIG. 6(a).

Figure 6B:
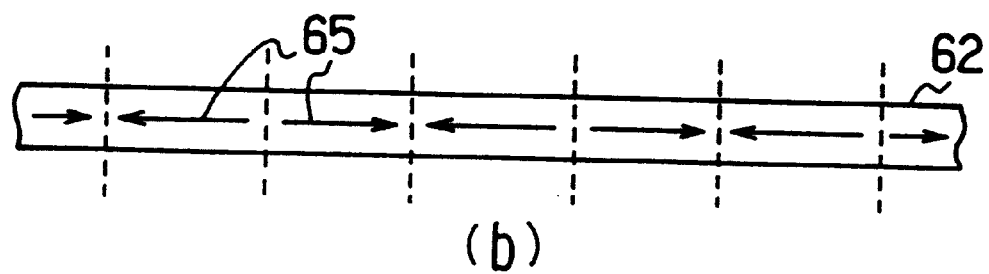
FIG. 6(b) shows an example of a record magnetization pattern written into the magnetic record medium by the method shown in FIG. 6(a)
Figure 6C:
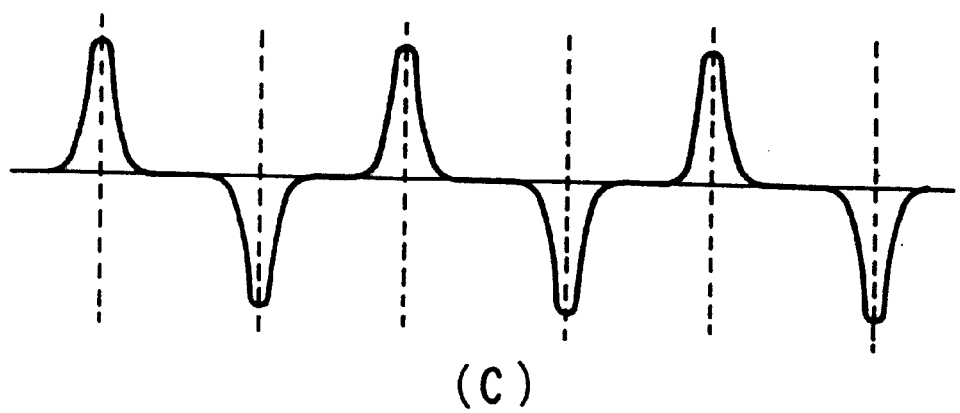
FIG. 6(c) shows an example of a read signal from the magnetization pattern written into the magnetic record medium.

The soft magnetic material or the semihard magnetic material that forms the protruding portion of the master information carrier is magnetized by the direct exciting field 75 in the direction along the track of the magnetic record medium 72 to generate the magnetic write field 74. The direct exciting field 75 cannot be so strong since it is applied to the magnetic record medium 72, too. The intensity of the direct exciting field 75 is preferably as large as, or below the coercive force of the magnetic record medium in most cases. If the intensity of the direct exciting field 75 is as large as, or less than the coercive force of the magnetic record medium, the magnetic field for writing 74 generated by the soft magnetic material or the semihard magnetic material of the protruding portion is much stronger than the intensity of the direct exciting field. Thus, the magnetization pattern can be written corresponding to the embossed pattern, in the same manner as shown in FIG. 6(b). The adequate intensity of the direct exciting field 75 can be varied due to the magnetic characteristics of the soft or semihard magnetic material that forms the protruding portion of the master information carrier, magnetic characteristics of the magnetic record medium, embossed pattern shape, or other factors. Therefore, the intensity of the direct exciting field should be optimized experimentally to obtain the most adequate writing characteristics in each case.

From the above viewpoint, the soft or semihard magnetic material that forms the protruding portion of the master information carrier preferably reaches substantial saturation by the direct exciting field 75 whose intensity is as large as, or below the coercive force of the magnetic record medium. Most soft magnetic materials show good saturation characteristics in a small magnetic field. However, some semihard magnetic materials need a large magnetic field for saturation, so attention should be paid when selecting the material. Material having a coercive force below 40 kA/m is preferable as the semihard magnetic material when writing into a hard disk having a usual coercive force or a large-capacity flexible disk. If the coercive force is more than 40 kA/m, an intensity of the direct exciting field 75 that is significantly larger than the coercive force of the magnetic record medium is necessary for stable magnetization of the semihard magnetic material along the track of the magnetic record medium 72. Thus, it is difficult to write with a precise resolution in some cases.

The writing method with applying the direct exciting field as shown in FIG. 7 is effective also in the case where the ferromagnetic material that forms the protruding portion of the master information carrier has a large coercive force, especially when applying an alternating bias magnetic field whose intensity is larger than the coercive force. As mentioned above, if an alternating bias magnetic field that is larger than the coercive force of the ferromagnetic material is applied in FIG. 6, the magnetization 63 of the ferromagnetic material that forms the protruding portion decreases, so that a sufficient magnetic field for writing 64 cannot be obtained. In this case, by superposing the direct exciting field on the alternating bias magnetic field, the total external magnetic field that is applied in the opposite direction to magnetization 63 of the ferromagnetic material decreases, so that the stable magnetic field for writing can be generated similarly to the case where the alternating bias magnetic field is not applied. Application of the alternating and decaying bias magnetic field superposed on the direct exciting field as mentioned above is also effective for the case where the ferromagnetic material that forms the protruding portion of the master information carrier is a semihard or soft magnetic material.

Figure 8:
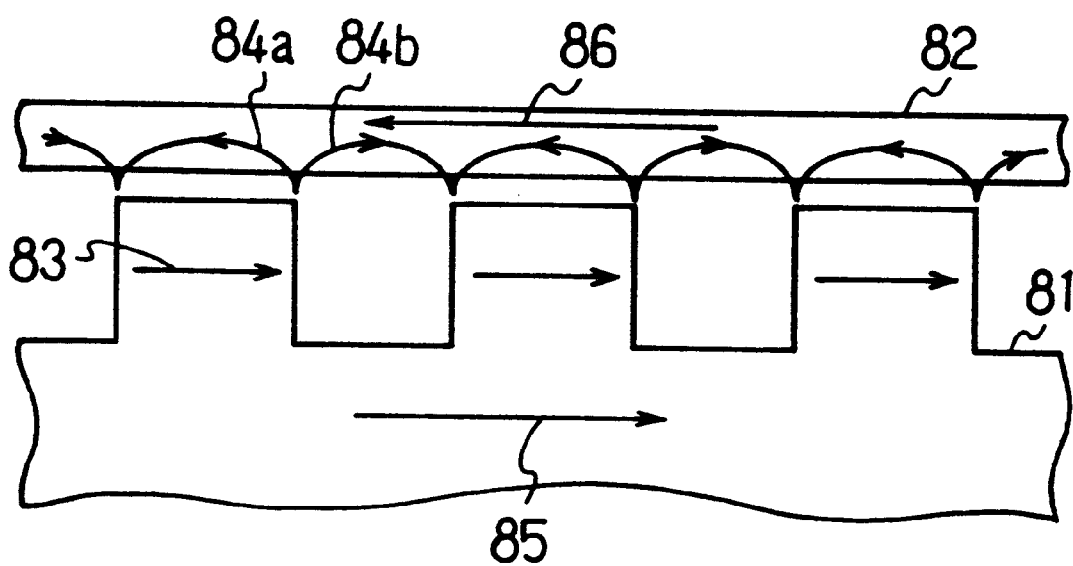
FIG. 8 shows yet another method for writing master information into a magnetic record medium using a master information carrier according to the present invention.

In some cases depending on the embossed pattern on the surface of the master information carrier, a better written state can be obtained by erasing the magnetic record medium previously with a direct saturation and giving an initial magnetization 86 in one direction as shown in FIG. 8.

The embossed pattern can be a variety of patterns depending on the information signal required for each application. Therefore, in some embossed pattern, either the magnetic field on the surface of the protruding portion site or the magnetic field on the bottom portion site is much weaker than the other. Thus, the weaker magnetic field cannot perform saturation writing, or the linearity of writing is deteriorated. In FIG. 8, it is preferable to erase the magnetic record medium 82 previously by a direct saturation in the direction of the weaker magnetic field, which is either the magnetic field 84a on the surface of the protruding portion site or the magnetic field 84b on the bottom portion site, to promote the saturation writing in this direction.

In FIG. 8, the magnetic record medium 82 is previously erased with the direct saturation magnetization in the opposite direction to the magnetization 83 of the ferromagnetic material that forms the protruding portion. However, it is clear from the above explanation that the polarity for erasing a magnetic record medium by the direct saturation depends on the case. For example, in some cases, a better resolution for writing is obtained by erasing the magnetic record medium 82 using a direct saturation in the same direction as the magnetization 83 of the ferromagnetic material at the protruding portion of the master information. Though the direct exciting field 85 is applied in the configuration shown in FIG. 8 in the same manner as shown in FIG. 7, the effect of previously erasing with a direct exciting field is obtained even if the direct exciting field 85 is not applied.

The above explanation concerns writing into in-plane magnetic record media. However, the writing method of this invention can be utilized for various magnetic recording media in a variety of embodiments to obtain similar effects.

Figure 9A:
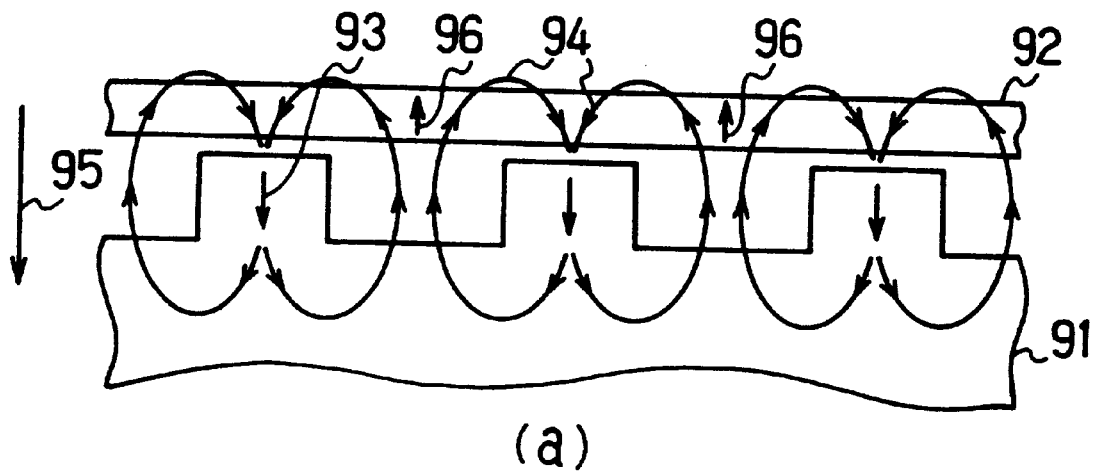
FIG. 9(a) shows another method for writing master information into a magnetic record medium using a master information carrier according to the present invention.
Figure 9B:
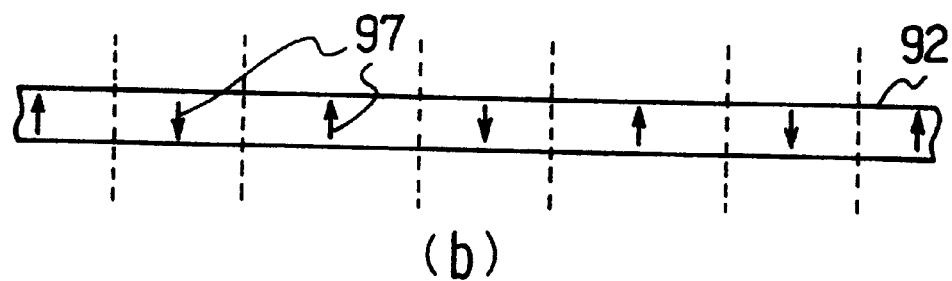
FIG. 9(b) shows an example of a magnetization pattern written into the magnetic record medium.
Figure 9C:
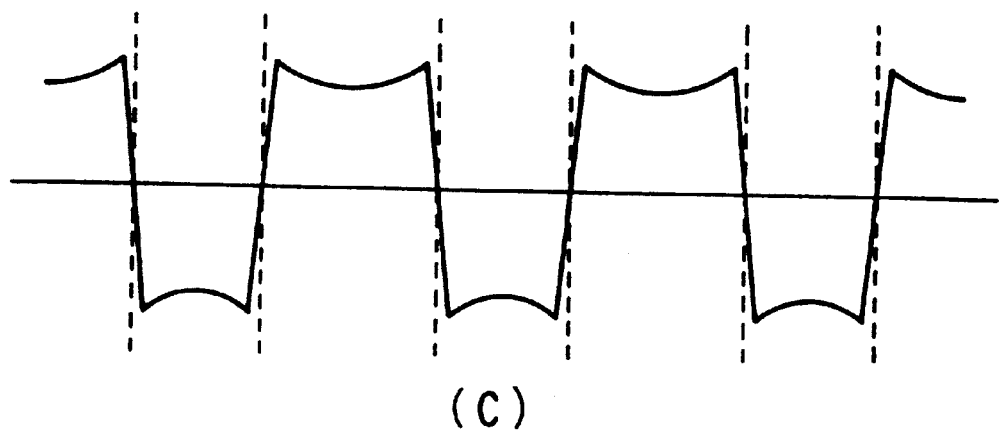
FIG. 9(c) shows an example of a read signal from the magnetization pattern shown in FIG. 9(b)

A typical variation of the writing method according to the present invention is shown in FIG. 9 where the master information is written into a perpendicular magnetic record medium. FIG. 9(a) shows the writing method of the master information signal into the perpendicular magnetic record medium using a master information carrier. FIG. 9(b) shows a magnetization pattern written into the perpendicular magnetic record medium. FIG. 9(c) shows an example of the waveform of a read signal read by a magnetoresistive (MR) type head from the magnetization pattern. FIGS. 9(a) and 9(b) are cross sections along the track direction of the magnetic record medium similar to FIGS. 6–8.

When writing into the perpendicular magnetic medium, magnetization 93 is applied to the ferromagnetic material of the protruding portion of the master information carrier 91 in the direction perpendicular to the surface of the magnetic record medium 92. Therefore, if the ferromagnetic material of the protruding portion is a ferromagnetic film, a thickness of the film should be large enough for reducing a demagnetization field in the direction perpendicular to the surface.

If the direct exciting field 95 is applied, its direction should be perpendicular to the surface of the magnetic record medium 92, differently from the in-plane writing. The previous erasing of the magnetic record medium 92 with direct saturation is performed also in the direction perpendicular to the surface of the magnetic record medium 92 so that the initial magnetization 96 can remain in the vertical direction.

(Second Embodiment)

This second embodiment will explain an example of the master information carrier having superior record resolution uniformly over the large area, and an example of the process for making the master information carrier efficiently at a low cost.

In the above mentioned first embodiment, the surface of the master information carrier shown in FIGS. 1–5 should be processed to make a fine embossed pattern corresponding to the information signal to be written for preformat, using photolithography or other techniques. However, depending on the process for making the master information carrier, it is sometimes difficult to form an embossed pattern corresponding to the information signal with a sufficient resolution, when forming the embossed pattern with a high record density in which a bit length is below several microns. Especially, if the master information disk is to be used for writing into a disk with large diameter such as 3.5 or 5 inches, usual photolithography process cannot provide a uniform accuracy over such a large area, so the embossed pattern may have some microscopic difference depending on its location.

For example, the master information carrier having a cross section shown in FIG. 3 was made by steps of forming a ferromagnetic film 32 on the surface of the planar substrate 31, coating a resist film on the surface, exposing and developing the resist film to form the pattern corresponding to the digital information signal, and forming the fine embossed pattern on the surface of the ferromagnetic film by a dry etching technique such as an ion milling.

Though the section profile of the protruding portion is simplified with a rectangular shape in FIG. 3, it is difficult to form such a rectangular section over a large area in a real master information carrier made using regular photolithography. The section profile of the protruding portion usually assumes a trapezoidal shape, where the length of the upper side differs from the length of the lower side, not a rectangular shape. In addition, the edges of the upper side at the surface of the trapezoid become rounded in general.

Such a section profile results primarily from the fact that the resolution of the exposing or developing process of the resist film is not sufficient for the bit length of the digital information signal. The section profile of the patterned resist film has already been a trapezoid and its edges at the upper side have already been rounded. Thus, the section profile of the protruding portion of the ferromagnetic film that is formed by the dry etching technique such as the ion milling becomes a rounded trapezoid, inheriting the section profile of the patterned resist film.

Furthermore, the above mentioned section profile cannot be uniform over a large area, so some microscopic differences of the section profile may be observed depending on the location, in spite of having the same patterning. Such a microscopic difference of the section profile of the embossed pattern may undesirably influence the S/N ratio of the signal written for the preformat.

The above problem can be solved by using an advanced photolithography technique that can realize sufficient accuracy and resolution over the large area. However, in this case, even if the above problems are solved, a substantially expensive exposing machine, resist material, developing liquid and other things are necessary. Consequently, the productivity of the master information carrier may drop and the cost for making the master information carrier may rise.

On the contrary, this embodiment can control the variation of the S/N ratio due to the variation of the section profile within a certain tolerance by improving the section profile of the embossed pattern even if an inexpensive photolithography process is used.

The inventors have searched for a preferred section profile of the embossed pattern that has little influence on the S/N ratio of the signal. As a result, it was found that a first or second configuration of the protruding portion of the master information carrier explained below can control the variation of the S/N ratio within a certain tolerance.

Figure 10:
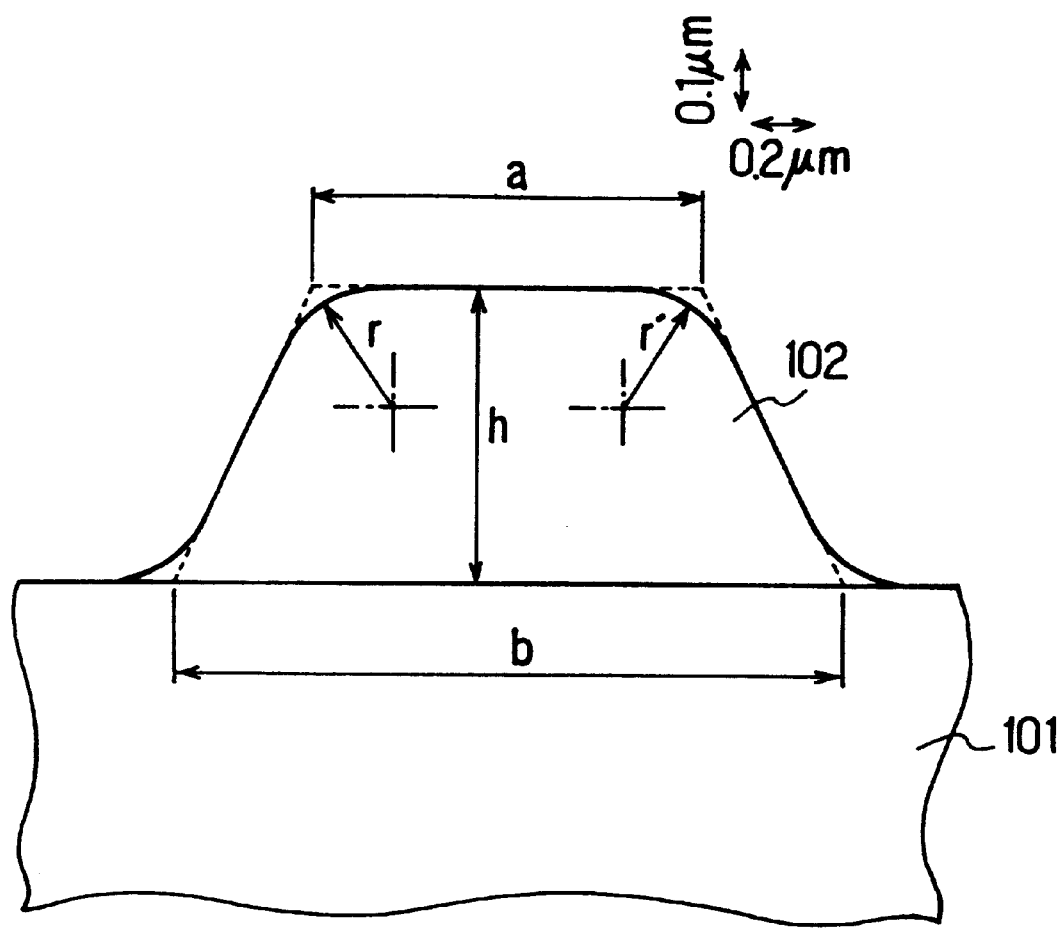
FIG. 10 shows an example of a cross section of the protruding portion of the master information carrier according to the present invention along the direction of bit length.

FIG. 10 shows a first configuration of the protruding portion. In this configuration, the section profile of the protruding portion along the bit length direction of the digital information signal is substantially a trapezoid with an upper side at the surface and a lower side on the substrate. The upper side length "a" is less than the lower side length "b", and the difference (b−a) between the both side lengths is less than twice the height of the trapezoid. Such a section profile of the protruding portion can control the variation of the S/N ratio due to the microscopic variation of the section profile within a certain tolerance, even when writing a digital information signal for the preformat, with several microns bit-length.

The S/N ratio of the read signal is influenced not only by the intensity of the magnetic field for preformat writing generated from the ferromagnetic film 102 at the protruding portion of the master information carrier, but also the gradient of the magnetic field at the boundary between the protruding portion and the bottom, i.e., at the edges of the upper side of the protruding portion. If the difference between the upper side length "a" and the lower side length "b" of the trapezoid section of the protruding portion is less than twice of the height "h" of the trapezoid, the gradient of the magnetic field is rather steep. Therefore, it could be established that the S/N ratio of the read signal is large and the variation of the S/N ratio due to the microscopic variation of the section profile is small under the above condition.

On the contrary, if the difference between the upper side length "a" and the lower side length "b" is more than twice of the height "h" of the trapezoid, leakage from slant faces decreases the gradient of the magnetic field at the edges of the upper side. Therefore, the variation of the S/N ratio of the read signal due to the variation of the section profile increases beyond a certain tolerance, so that a uniform and sufficient S/N ratio of the read signal cannot be obtained over a large area.

If the bit length of the digital information signal to be written is less than one micron, field gradient variation due to the microscopic shape variation at the edges of the upper side can influence the S/N ratio of the read signal. In this case, curvature radii r, r' at edges of the upper side are preferably set below a half of the upper side length. Thus, the variation of the S/N ratio due to the microscopic variation of the section profile is controlled within a tolerance, even when a digital signal with a bit length of less than 1 µm is recorded.

As mentioned above, the first configuration permits the section profile of the protruding portion to have a trapezoid shape, so the embossed pattern can be formed by a regular, widely used photolithography process, without having to use an advanced photolithography technique. Therefore, the master information carrier having the first configuration can be produced efficiently at low cost.

As explained in the first embodiment, the thickness of the ferromagnetic film may influence the S/N ratio of the read signal when performing preformat writing by use of the above mentioned master information carrier. If the thickness of the ferromagnetic film 102 in FIG. 10 is too thin, a sufficient magnetic field cannot be generated for writing, and the gradient of the magnetic field may decrease at the boundary of the protruding portion and the bottom portion. Thus, it is difficult to perform sufficient writing.

On the other hand, when writing a preformat signal into an in-plane magnetic record medium, if the thickness of the ferromagnetic film 102 is too thick, the demagnetizing field due to the profile of the protruding portion makes it difficult to generate a sufficient magnetic field. For example, preformat writing into the in-plane magnetic disk is performed by applying a direct exciting field along the circumferential direction in the disk plane for magnetizing the ferromagnetic film 102 at the protruding portion of the master information carrier, and the digital information signal corresponding to the embossed pattern is written. However, if the upper side length "a" of the protruding portion corresponding to the bit length of the signal is not sufficiently larger than the thickness of the ferromagnetic film 102, the demagnetizing field in the opposite direction to the magnetization of the ferromagnetic film 102 increases, so that the magnetic field for writing generated by the protruding portion is weakened.

The influence of the above mentioned demagnetizing field causes a drop of the S/N ratio if the thickness of the ferromagnetic film 102 is larger than a half of the upper side length "a" of the protruding portion. However, the drop of the S/N ratio is small enough to be neglected if the thickness of the ferromagnetic film 102 is smaller than a half of the upper side length "a" of the protruding portion. Therefore, it is preferable to ensure that the thickness of the ferromagnetic film 102 can generate a sufficient magnetic field for writing in a thickness region below one half of the upper side length "a", especially in a master information carrier with in-plane preformat writing.

On the other hand, when writing the preformat signal into a perpendicular magnetic record medium, a direct exciting field is applied in the direction perpendicular to the ferromagnetic film 102 to magnetize the ferromagnetic film 102, and a digital information signal is written corresponding to the embossed pattern. In this case, differently from the case with in-plane writing, the magnetic field for writing is dropped due to the demagnetizing field, the more the ferromagnetic film becomes thinner. Therefore, a master information carrier to be used for preformat writing into the perpendicular magnetic record medium should have a thickness of the ferromagnetic film 102 that is larger than the upper side length "a", preferably more than twice the upper side length "a" of the protruding portion of the ferromagnetic film 102.

Figure 11:
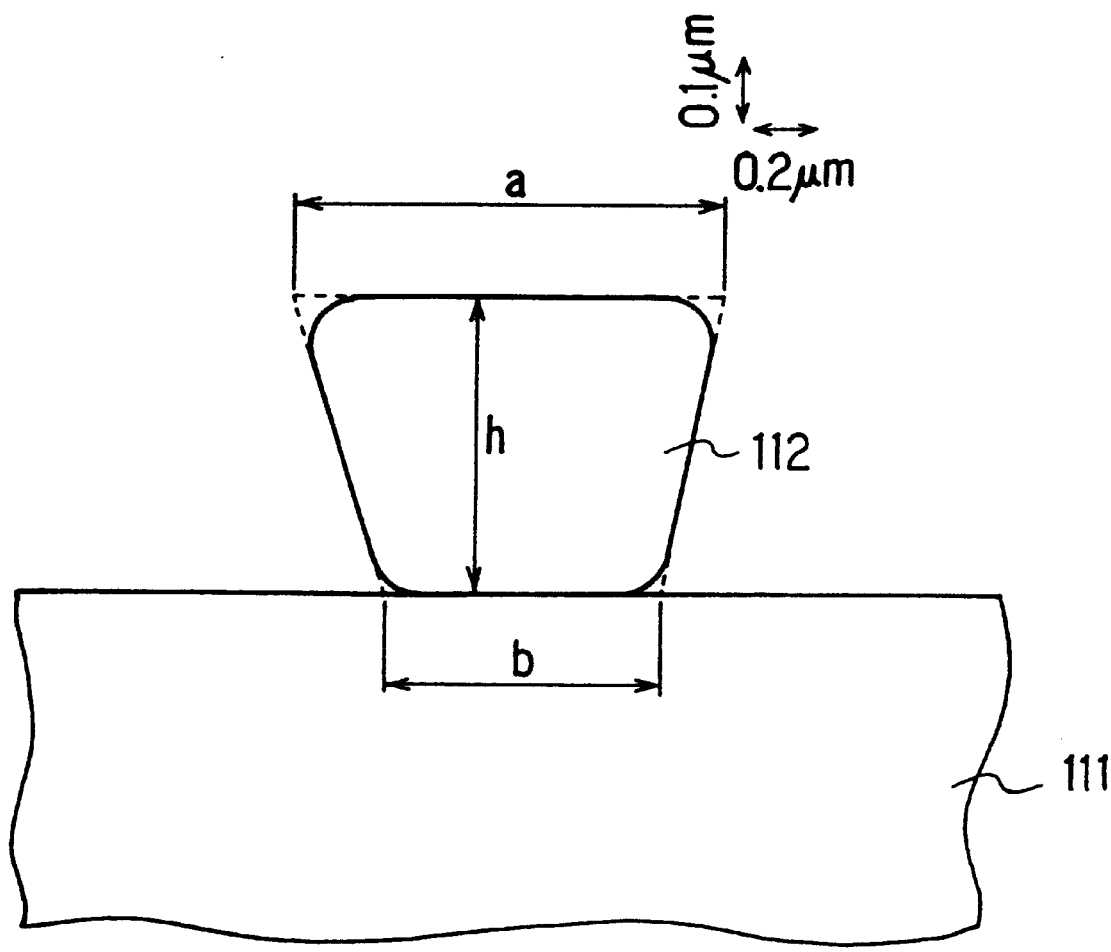
FIG. 11 shows another example of a cross section of the protruding portion of the master information carrier according to the present invention along the direction of bit length.

FIG. 11 shows a second configuration of the protruding portion. In this configuration, the section profile of the protruding portion along the direction of the bit length of the digital information signal is substantially a trapezoid with an upper side at the surface and a lower side on the substrate, and the upper side length "a" is larger than the lower side length "b". This upside-down trapezoid section of the protruding portion can obtain a sufficient S/N ratio of the read signal and control the variation of the S/N ratio within a tolerance over a large area, in spite of some microscopic variation of the section profile, even when a digital signal with a bit length of less than 1 µm is recorded.

As previously mentioned, the S/N ratio of the read signal is influenced by the intensity of the magnetic field for preformat writing generated from the ferromagnetic film at the protruding portion of the master information carrier, and by the gradient of the magnetic field at the boundary between the protruding portion and the bottom portion, that is the edges of the upper side of the protruding portion. In the second configuration, the angles between the upper side and slant faces are acute angles since the upper side length "a" is larger than the lower side length "b" of the trapezoid section of the protruding portion. Such a configuration reduces the influence of the leakage magnetic field generated by the slant faces and provides a steep gradient of the magnetic field at the edges of the upper side, so that a sufficient S/N ratio of the read signal is obtained.

Furthermore, the difference between the upper side length "a" and the lower side length "b" as well as the gradient variation of the magnetic field at each edge of the upper side is small in the second configuration. As a result, the variation of the S/N ratio of the read signal due to the microscopic variation of the section profile also can be within a tolerance. Therefore, as in the first embodiment, a uniform and sufficient S/N ratio of the read signal over a large area can be obtained.

The thickness of the ferromagnetic film 112 influences the S/N ratio of the read signal in the second configuration, too. The standard for determining the thickness of the ferromagnetic film 112 is the same as that mentioned in the first configuration. The thickness of the ferromagnetic film 112 is preferably less than a half of the upper side length "a" for the master information carrier for an in-plane magnetic record medium, and is preferably more than twice the upper side length "a" for the master information carrier for a perpendicular magnetic record medium.

The master information carrier having the second configuration can be manufactured by a photolithography technique using, for example, a liftoff process. The following explains an example of a process suitable for making a master information carrier having the second configuration.

FIG. 12 shows an example of the process for making the master information carrier according to the second configuration.

Figure 12A:
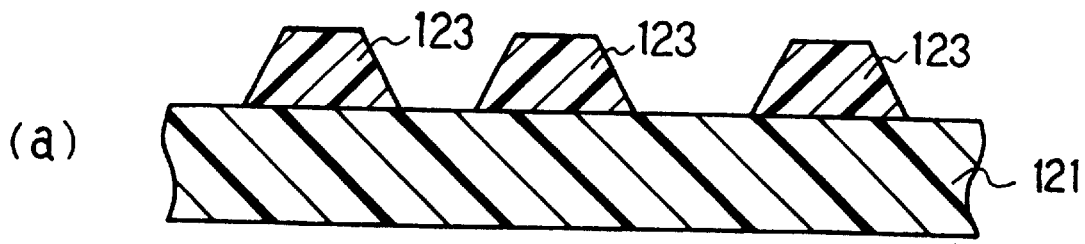
FIG. 12 shows an example of a process for making the master information carrier according to the present invention.

First, as shown FIG. 12(a), the embossed pattern corresponding to the digital information signal is formed on the substrate 121 with the photoresist film 123. The cross section in the bit-length direction of the protruding portion formed by the photoresist film 123 is substantially trapezoidal with an upper side at the surface and a lower side on the substrate, and the upper side length is shorter than the lower side, as shown in FIG. 12(a).

Figure 12B:
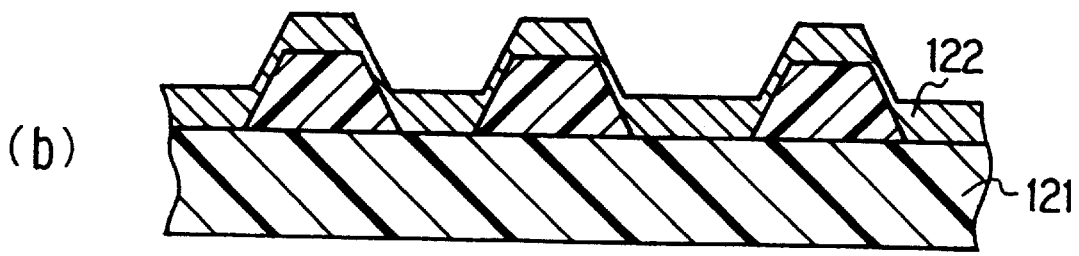

Then, as shown in FIG. 12(b), the ferromagnetic film 122 is formed on the substrate 121 and the protruding portion formed by the photoresist film 123. A usual method such as a vacuum vapor deposition, sputtering or plating can be used for forming the ferromagnetic film 122.

Figure 12C:
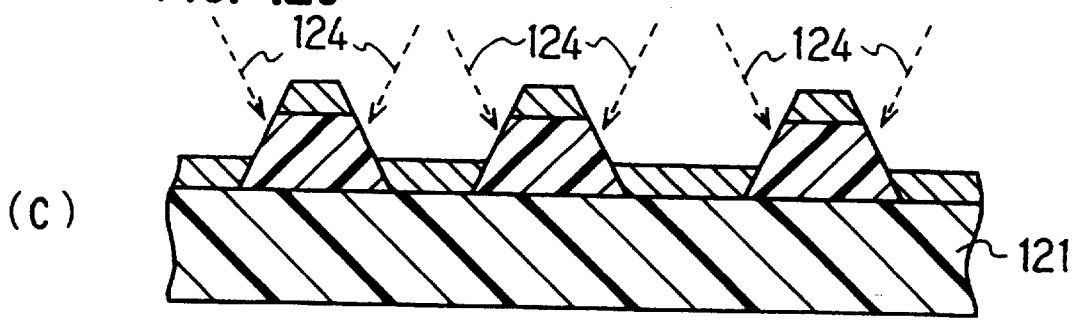
Figure 12D:
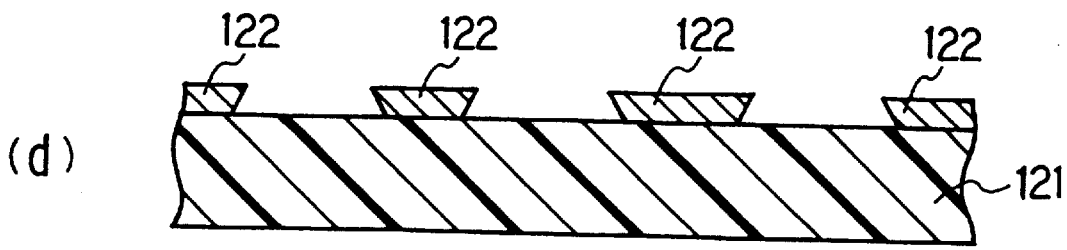

Then, as shown in FIG. 12(c), the surface of the ferromagnetic film 122 is etched a little by ion milling or another method. After that, the photoresist film 123 and the ferromagnetic film 122 formed on the photoresist film 123 are removed by a liftoff method. Thus, as shown in FIG. 12(d), the master information carrier is made, which includes the substrate 121 and the protruding portion of the ferromagnetic film 122 formed on the substrate 121, and the section profile of the protruding portion is a trapezoid with an upper side longer than a lower side. The liftoff process is performed by melting the photoresist film 123 by using a special solvent called "remover", for removing the ferromagnetic film 122 formed on the photoresist film 123 together with the photoresist film 123.

The etching step of the ferromagnetic film surface shown in FIG. 12(c) is performed for making the liftoff easy by removing the ferromagnetic film 122 deposited on the slant faces of the protruding portion formed with the photoresist film. This step can be eliminated if the thickness of the ferromagnetic film 122 is thin. In this case, however, the accuracy of patterning of the ferromagnetic film 122 after the liftoff may be deteriorated and ferromagnetic film or photoresist film 123 can remain partially. Therefore, it is better not to eliminate the etching step shown in FIG. 12(c).

In the etching step shown in FIG. 12(c), ion milling for etching the ferromagnetic film can be replaced with a vacuum dry process such as sputter etching or a wet process such as chemical etching.

If a vacuum dry process such as sputtering or ion milling is used for this etching step, it is preferable to irradiate the ion 124 from the slant direction against the surface of the substrate 121 since this etching process is performed for making the liftoff easy by removing the ferromagnetic film 122 deposited on the slant faces of the protruding portion formed with the photoresist film 123. According to experiments, it was found that the ferromagnetic film 122 deposited on the slant faces can be removed effectively when an incident angle of the ion 124 with respect to the normal of the substrate 121 is more than 20 degrees.

FIG. 13 shows another example of the process for making the master information carrier having the second configuration.

Figure 13A:
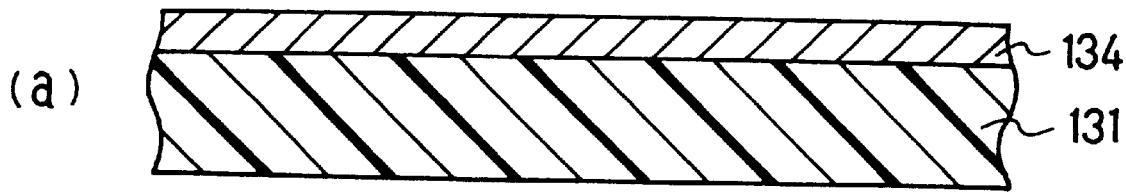
FIG. 13 shows another example of a process for making the master information carrier according to the present invention.
Figure 13B:
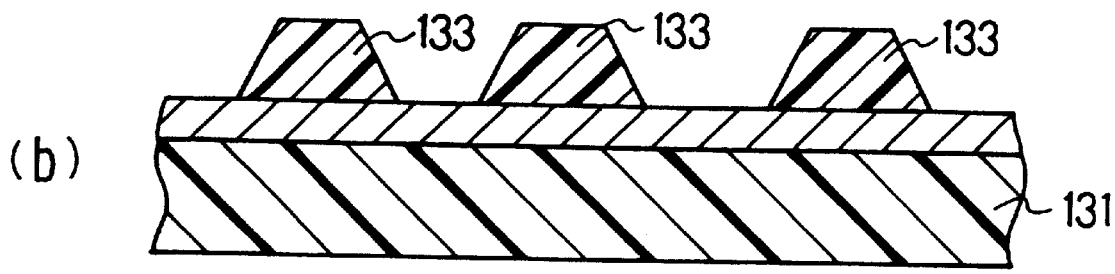

First, as shown in FIG. 13(a), a conductive film 134 is formed on the substrate 131. Then, an embossed pattern corresponding to the digital information signal is formed on the conductive film 134 using a photoresist film 133, as shown in FIG. 13(b). The section profile of the protruding portion formed with the photoresist film 133 is a trapezoid with an upper side at the surface that is longer than a lower side on the substrate as shown in FIG. 13(b).

Figure 13C:
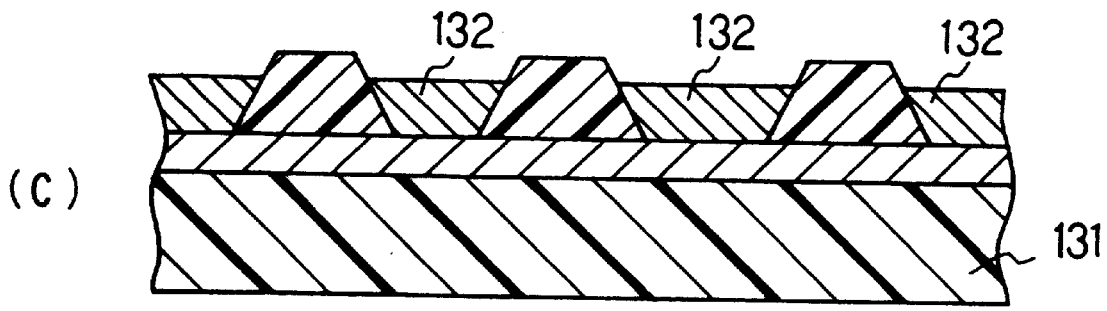

Then, as shown in FIG. 13(c), a ferromagnetic film 132 is formed on the conductive film 134 and the protruding portion of the photoresist film 133 with an electroplating method.

Figure 13D:
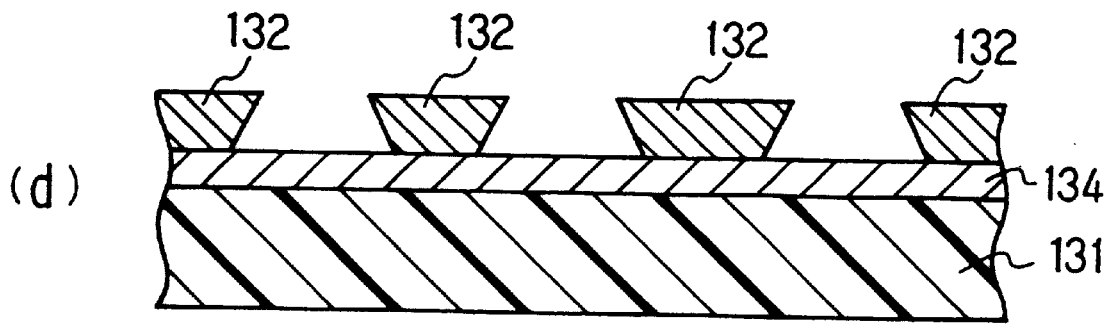

Then, the photoresist film 133 is removed. Thus, as shown in FIG. 13(d), the master information carrier is completed, which includes a conductive film 134 and a protruding portion of the ferromagnetic film 132 whose section profile is a trapezoid with an upper side longer than a lower side.

The photoresist film 133 is removed by melting the photoresist film 133 by a solvent called "remover" in the same way as shown in FIG. 12(d).

Differently from the process shown in FIG. 12, this process shown in FIG. 13 forms the ferromagnetic film 132 by electroplating, so the ferromagnetic material does not deposit on the surface of the protruding portion of the photoresist film 133. Therefore, the photoresist film 133 can be removed easier than in the process shown in FIG. 12. In addition, an etching step of the ferromagnetic film 132 is not required in this process. The step for forming the conductive film 134, which is required in this process shown in FIG. 13, can be eliminated by using a substrate 131 made of a conductive material.

Though the material and thickness of the conductive film 134 are not limited, it is preferable to obtain a film with a small surface-roughness. If the surface-roughness of the conductive film 134 is large, the surface-roughness of the ferromagnetic film 133 formed thereon may also become large, and the surface-roughness can influence a distribution of the magnetic field for preformat writing. Therefore, it is desirable to select the continuous thin film material with little surface roughness and as thin as possible, as long as a sufficient conductivity for electroplating can be obtained.

If the reflectivity of the surface of the conductive film 134 is large at a wavelength region of light for exposing the photoresist film, the resolution at exposure can be deteriorated due to the influence of the reflecting light. Therefore, it is desirable to use a material for the conductive film whose reflectivity at the surface is small, preferably less than 50% at a wavelength of light for exposing the photoresist film 133.

As mentioned above, the resolution at exposing the photoresist film can be improved when the conductive film 134 has a function of anti-reflection coating compared with the case where the patterning of the resist film is performed directly on the substrate 131. This conductive film 134 with anti-reflection function can be a conductive carbon film or a film with some impurities containing a carbon as a main component, for example.

It is also preferable when selecting a material for the conductive film to consider a compatibility of the material with the ferromagnetic material to be disposed on the conductive film 134. Deposition rate, construction or magnetic characteristics of the ferromagnetic film 132 formed on the conductive film by electroplating may change depending on the material of the conductive film. Therefore, it is preferable to select the most proper conductive film material considering the ferromagnetic film material to be used.

If the substrate material is selected from conductive material, it is preferable to pay the same attention as mentioned above concerning the conductive film.

In the example of the process for making a master information carrier having the second configuration mentioned above, the section profile of the protruding portion of the photoresist film 133 is permitted to be a trapezoid. Therefore, a regular, widely used photolithography process can be used without using a special advanced photolithography technique. Thus, the master information carrier can be produced efficiently at low cost in the same way as the master information having the first configuration explained previously.

(Third Embodiment)

It is necessary that the surface of the master information carrier and the surface of the magnetic record medium keep a uniform and secure contact when writing a master information into the magnetic record medium. If secure and uniform contact is not kept between the two surfaces, the master information signal can be written incorrectly into the magnetic record medium due to spacing loss. In this case, the read signal from the medium may include a partial lack of data or deteriorated S/N ratio.

This embodiment provides a suitable configuration of the master information carrier for maintaining a secure and uniform contact between the surface of the master information carrier and the surface of the magnetic record medium, a master information carrier that can perform preformat writing with high reliability, as well as a method for producing the master information carrier.

If the magnetic record medium into which the master information is preformat-written is a hard disk, its substrate is a hard material such as metal, glass, silicon or carbon. Therefore, it is preferable that the substrate of the master information carrier has flexibility to a certain extent so that the surface of the master information carrier can compensate a fine wimple or bending to keep a secure contact state over the whole disk surface. A polymer material is suitable for making such a substrate of the master information carrier.

The master information carrier of the present invention can keep a secure and uniform contact with the surface of the hard disk that includes a hard substrate and a magnetic film formed on the substrate, by using a polymer material for the substrate of the master information carrier. Thus, the master information carrier of the present invention can raise the reliability of the preformat writing.

However, for preformat recordings of harddisks having a future areal recording density in the 10-gigabit-order, substantial improvement was found to be necessary in environmental resistance properties or handling properties when using a polymer material that is soft compared to the hard disk substrate for the substrate of the master information carrier. For example, dimension stability against an expansion or contraction due to a change of temperature or humidity, a physical and chemical stability in the process for making the master information carrier, and a processability of the material should be raised. In addition, to ensure a secure and uniform contact between the surface of the master information carrier and the surface of the magnetic record medium, an electrostatic sticking of dust should be suppressed.

The inventors have studied the structure of master information carriers having a substrate that includes a polymer material. As a result, it was found that the above mentioned problems are solved by using a master information carrier having a structure as explained below.

First, a structure for improving the environmental resistance property is explained. A substantially high accuracy of dimensions should be required of the substrate of the master information carrier to write preformat data into a hard disk having an areal recording density of 10-giga-bit order in the future. Furthermore, this high accuracy should be realized in various circumstances such as manufacturing process, preformat-writing step, and storing of the master information carrier. There is no material that can satisfy such a request for the environmental resistance by itself alone.

For example, polyimide and polyamide resins have excellent stability against heat and chemicals, but they have a tendency to expand due to water absorption. The tendency of polyethylenetherephtalate resins to absorb water and expand is relatively small, but heat stability is a problem.

Polypropylene or Teflon (trademark of polytetrafluorethylene) resins have excellent stability of dimension under various circumstances, but they have weak adhesiveness with the ferromagnetic film.

The substrate of the master information carrier according to the present invention has a multi-layer construction of at least two of the polymer materials having different properties as mentioned above. Thus, the advantages of each material are utilized and disadvantages of each material are compensated.

As one of the preferable examples, the substrate of the master information carrier has a multi-layer construction of a polypropylene or Teflon resin and a polyimide or a polyamide resin. This master information carrier can maintain an excellent dimension stability under a variety of circumstances, owing to the properties of the polypropylene or Teflon resin, while it has sufficient adhesiveness with the ferromagnetic film that is formed on the surface of the polyimide or polyamide resin.

The appropriate combination of polymer material and thickness of each layer for such a multi-layer construction can be changed depending on the thermal history in the process for making the master information carrier, temperature and humidity when writing preformat data, temperature and humidity when storing the master information carrier and other conditions. It is necessary to select the most suitable combination and thickness ratio of layers in accordance with each condition.

Second, a structure for improving the processability is explained. It is sometimes necessary to process the master information carrier into a proper shape in accordance with a shape of the magnetic record medium after forming the embossed pattern corresponding to the master information. For example, the master information carrier that is used for writing preformat master information into a hard disk preferably has a proper dimension corresponding to a certain diameter of the hard disk, so that it can be easily handled for preformat writing.

However, a master information carrier having a substrate made of a polymer material usually has a bad processability. Especially, plastic or other deformation sometimes occurs in the process, and deterioration of dimension accuracy may occur due to the deformation.

The master information carrier of the present invention has a substrate including a base made of a metal, alloy or ceramic material; and a polymer material layer formed on the surface of the base. The processability of the whole master information carrier is improved and plastic deformation hardly occurs in the polymer material layer formed on the surface of the base, resulting from the excellent processability of the relatively hard base. In addition, a macroscopic stability in shape and handling properties of the master information carrier are raised as a result of the excellent processability of the hard base.

It is difficult for the hard base to meet a fine wimple or bending of the magnetic record medium. However, the flexible polymer material layer formed on the surface of the substrate can compensate a fine wimple or bending of the magnetic record medium to ensure secure and uniform contact state between the protruding portion of the ferromagnetic film of the master information carrier and the surface of the magnetic record medium.

Furthermore, when the master information carrier comprises a base made of a metal alloy or ceramic material and a polymer material layer formed on the surface of the base, the effect of dimension accuracy concerning environmental resistance can be improved, too.

The polymer material layer can be formed on the surface of the base by a variety of methods such as sticking, coating or flowing of monomer or polymer precursor followed by polymerization after the coating or flowing, or vacuum vapor deposition of the polymer material.

FIG. 14 illustrates an example of the process for making the master information carrier having the above-mentioned structure.

Figure 14A:
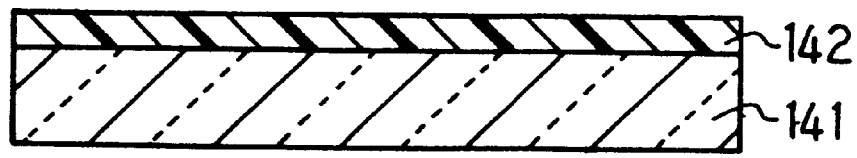
FIG. 14 shows yet another example of a process for making the master information carrier according to the present invention.

First, a polyimide solution (Torayneece: trademark of Toray Industry Inc.) is diluted with cyclohexanol into a predetermined concentration, and is coated onto the surface of the glass base 141 by using a spin-coater. Then, it is cured at high temperature to obtain the substrate comprising the glass base 141 and the polyimide layer 142 formed on the glass base 141, as shown in FIG. 14(a). The thickness of the polyimide layer 142 should be optimized depending on the condition of the application. In one example, it was approximately 1.0 micron after curing.

Figure 14B:
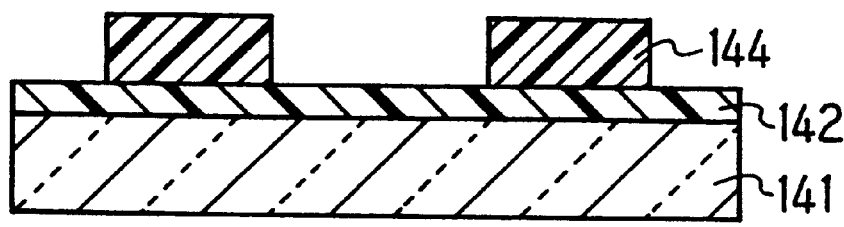

Then, a photoresist film 144 is formed on the polyimide layer 142, and exposed and developed to make the embossed pattern corresponding to the master information signal as shown in FIG. 14(b).

Then, a ferromagnetic film 143 is formed on the polyimide layer 142 and the protruding portion of the photoresist film 144 by using variety of methods such as a vacuum vapor deposition, sputtering, or plating.

Figure 14C:
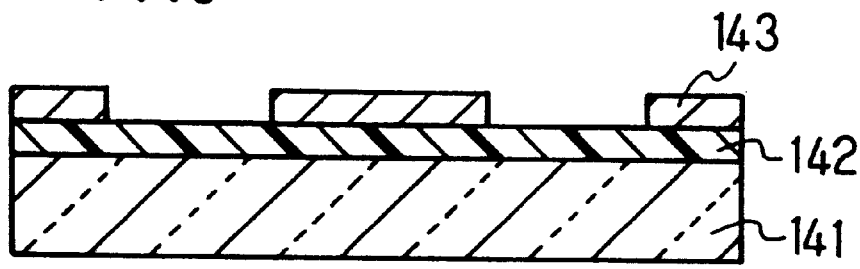

Finally, the photoresist film 144 and the ferromagnetic film 143 are removed by the liftoff method. As a result, the master information carrier is obtained as shown in FIG. 14(c), which comprises a substrate including the glass base 141 and the polyimide layer (polymer material layer) 142, and the protruding portion 143 of the ferromagnetic film formed on the polyimide layer 142 of the substrate.

The polymer material layer can include a plurality of polymer materials and is not limited to a single material, considering elasticity, resistance to chemicals, or other properties. A developer for developing the photoresist film, a remover for liftoff, an etchant for wet etching and other solutions are usually strong acid or alkaline. The polymer material such as a polyimide or a polyamide has an excellent resistance to acid or alkali and is suitable for the material forming the very surface of the substrate.

Next, a structure for preventing the master information carrier from gathering dusts by static electricity in the preformat writing step is explained. The electrostatic sticking of dust during the preformat writing step should be suppressed to ensure a secure and uniform contact of the surface of the master information carrier with the surface of the magnetic record disk. If dust sticks to a spot of the surface of the master information carrier, a deterioration of the S/N ratio of the read signal or partial lack of read signal may occur at the spot due to spacing loss.

In the master information carrier of the present invention, the polymer material that forms at least the surface of the substrate has a conductivity that can prevent the substrate from taking an electric charge. Thus, the electrostatic sticking of dust to the master information carrier is suppressed and the preformat writing can be performed with high reliability.

Particles whose main component is a conductive substance may be dispersed in the polymer material that forms at least the surface of the substrate. The main component of such particles is preferably a carbon. Such particles whose main component is a carbon can be dispersed easily in the polymer material and are inexpensive.

As another example of the structure for preventing the electrostatic sticking of a dust, a thin conductive film (e.g., a thin metal film) may be formed on the surface of the polymer material layer formed on the surface of the base, wherein a thickness of the conductive film should be thin enough not to obstruct the elasticity of the polymer material layer. For example, in the process, the thin conductive film is formed on the surface of the base made of polymer, and the embossed pattern is formed with the ferromagnetic film on the conductive film. This construction can prevent electrostatic and sticking of dust since the surface of the master information carrier is made of only conductive material.

(Fourth Embodiment)

As mentioned above, it is necessary to ensure a secure and uniform contact between surfaces of the master information carrier and the magnetic record medium in the writing process of the master information for maximizing the effect of the writing method of the present invention. If the secure and uniform contact between the surfaces is not obtained, a spacing loss causes a partial lack of a read signal, or deterioration of S/N ratio due to a small written signal level In addition, the magnetic transition may not be sharp at the edges of a track due to diffusing of the magnetic field for writing, so that sufficient off-track characteristics may not be obtained.

The master information carrier of this embodiment can ensure the secure and uniform contact between the surface of the master information carrier and the surface of the magnetic record medium by a different configuration from that of the third embodiment mentioned above. A suitable apparatus for writing the master information into a magnetic record medium with high reliability using this master information carrier is also provided.

A first configuration of the master information carrier of this embodiment has a substrate surface including areas where an embossed pattern corresponding to information signal is formed and areas where the embossed pattern is not formed. A ferromagnetic film is formed at least on surfaces of protruding portions of the embossed pattern, and through holes are provided at least partially in the area where the embossed pattern is not formed.

A second configuration of the master information carrier of this embodiment comprises an area in a surface of a substrate, where an embossed pattern is formed corresponding to information signal, and another area where the embossed pattern is not formed, wherein a height of the surface of at least a part of the area where the embossed pattern is not formed is lower than that of the area where the embossed pattern is formed.

The apparatus for writing an information signal into a magnetic record medium using the above-mentioned master information carrier comprises means for forcing the master information carrier and the magnetic record medium to contact with each other, means for positioning the master information carrier and the magnetic record medium, and means for applying a magnetic field for exciting the ferromagnetic film formed on the surface of the protruding portion of the master information carrier.

A first concrete configuration of the apparatus mentioned above utilizes the master information carrier having through holes provided at least partially in the area where the embossed pattern is not formed, as mentioned above as the first configuration. The apparatus has means to force the master information carrier (embossed pattern) and the magnetic record medium to contact securely with each other by sucking air between the master information carrier and the magnetic record medium through the through holes after the master information carrier and the magnetic recording medium are contacted with each other.

A second specific configuration of the apparatus mentioned above utilizes the master information carrier whose height of the surface of at least a part of the area where the embossed pattern is not formed is lower than that of the area where the embossed pattern is formed, as mentioned above as the second configuration. The apparatus has means to force the embossed pattern of the master information carrier and the magnetic record medium to contact securely with each other by sucking out air between the area of the master information carrier where the embossed pattern is not formed, and the magnetic record medium after the master information carrier and the magnetic recording medium are contacted with each other.

Using the above-mentioned master information carrier and writing apparatus, a magnetic record medium can contact with the master information carrier securely and uniformly. Thus a preformat writing can be performed with high reliability.

It is preferable that the apparatus comprises a pair of flanges as means to force the master information carrier and the magnetic recording medium to contact tightly with each other, between which the master information carrier and the magnetic record medium are disposed, and members for fastening the periphery of the pair of flanges to each other. If the above-mentioned means with the air suction mechanism further comprises these flanges and fastening members, a more secure and uniform contact can be obtained between the master information carrier and the magnetic record medium. When a duct for air suction is connected to a center portion of the master information carrier or the magnetic record medium, the suction force may be applied to the center portion strongly, so that the master information carrier or the magnetic record medium may have a warp. In this case, the above mentioned flanges and fastening members suppress the warp so that the master information carrier and the magnetic record medium can contact securely and uniformly. It is more preferable to insert an elastic member between one flange and the master information carrier, and/or, between the other flange and the magnetic record medium. Thus, the master information carrier and the magnetic record medium can contact more securely and uniformly.

The above-mentioned means for alignment of the master information carrier and the magnetic recording medium preferably include a marker provided at the inner circumference or outer circumference of the master information carrier corresponding to the inner circumference or outer circumference of the magnetic record medium.

The following the configurations of this embodiment of the present invention in detail, referring to FIGS. 15–21.

Figure 16:
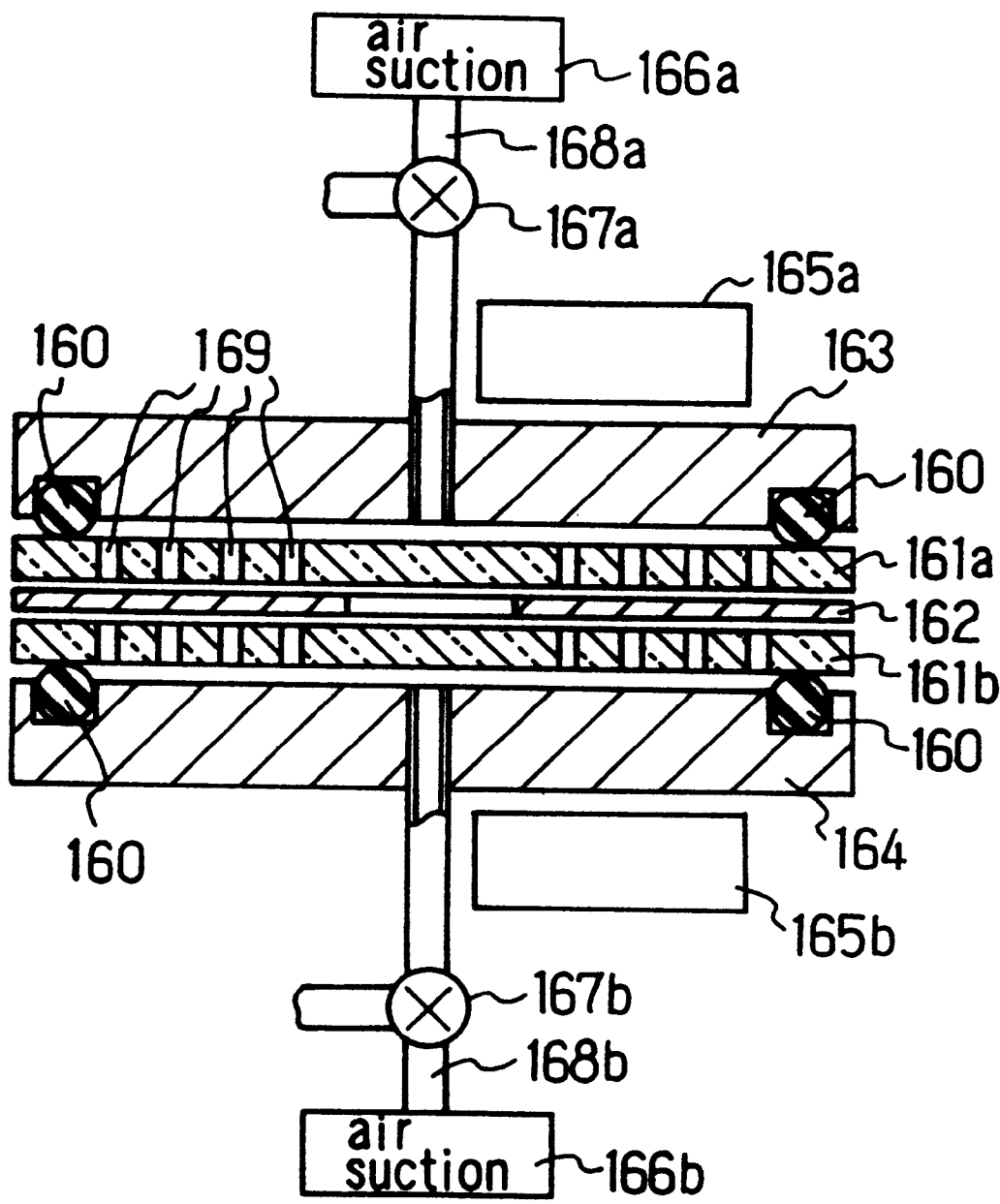
FIG. 16 is a partial cross section showing an apparatus for writing information signal of the master information carrier shown in FIG. 15 into a magnetic record medium.

FIG. 16 is a cross section showing an example of an apparatus for writing information signal provided in the master information carrier into a magnetic record medium. Numeral 161a and 161b denote master information carriers, 162 denotes a hard disk, 163 denotes an upper flange, 164 denotes a lower flange, 165a and 165b denote permanent magnets, 166a and 166b denote air suction devices, 167a and 167b denote three-way valves, 168a and 168b denote suction ducts, and 160 denotes an O-ring. The magnetization direction of the permanent magnets 165a, 165b is from back to front of the paper.

Figure 15:
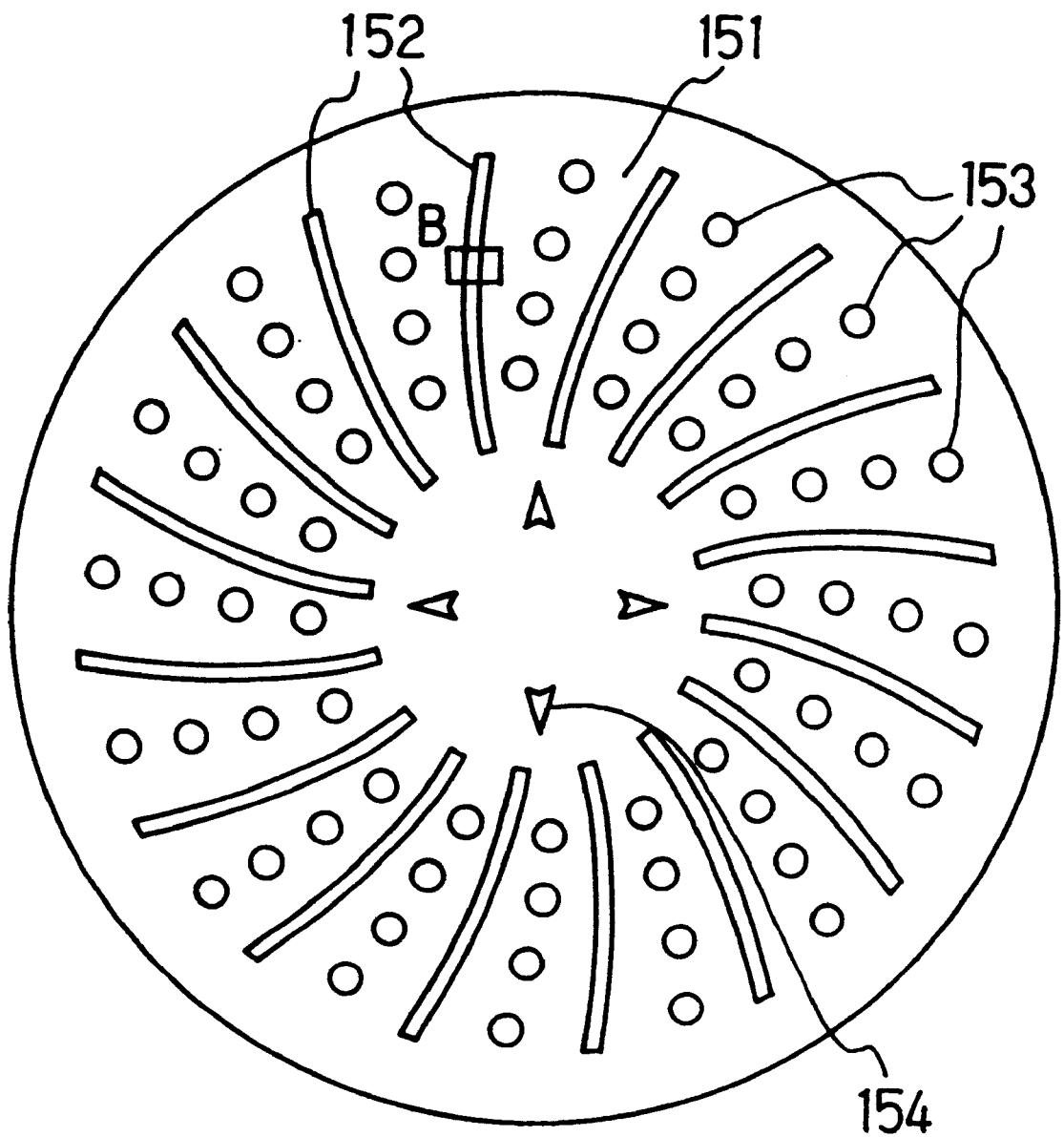
FIG. 15 is a plan view of an example of a master information carrier according to the present invention.

The surface of the master information carrier 161a, 161b includes an area 152 disposed once every predetermined angular distance, where a fine embossed pattern is formed corresponding to the information signal as shown e.g. in FIG. 15. A part of the area 152 (region B in FIG. 15) is shown enlarged in FIG. 1. As explained in the first embodiment, the master information provided as an embossed pattern in area 152 includes a tracking servo signal, a clock signal and address information signal that are disposed sequentially along the track direction. In FIG. 1, the hatched portions are protruding portions whose surface is made of a ferromagnetic material such as Co or Ni—Fe.

As mentioned in the first embodiment, a preferable step height between the surface of the protruding potion and the bottom of the embossed pattern corresponding to the information signal varies depending on surface properties of the magnetic record medium into which the master information is written and the bit size of the master information. In general, it is more than 0.05 micron, preferably more than 0.1 micron. It was 0.5 micron in one example.

As shown in FIG. 15, the master information carrier 151 has through holes 153 except at areas 152 where the embossed pattern is formed corresponding to the information signal. If the substrate of the master information carrier is made of glass, the through holes 153 can be formed by well-known processes such as an ultrasonic process, a laser process or wet etching and other methods. It is preferable that a diameter of the through holes is as small as possible and the number of the through holes is as large as possible. In an example, through holes with a diameter of 1.0 mm were disposed in a density of 1.0 per 3.0 mm×3.0 mm area by ultrasonic processing.

When writing the master information signal into a hard disk, i.e. a magnetic record medium, centering of the master information pattern and the hard disk is required before contacting them. To facilitate this centering, the master information carrier 151 has markers 154 at the inner circumference as shown in FIG. 15. The marks are formed in same the step in which the embossed pattern corresponding to the information signal is formed. The markers 154 disposed at the inner circumference of the master information carrier 151 are aligned to the inner circumference of the hard disk. Alternatively, markers can be disposed at the outer circumference of the master information carrier 151 to be aligned to the outer circumference of the hard disk. If the magnetic record medium is not a disk having an inner circumference, but a magnetic card or other sheet medium, markers of the master information carrier 151 disposed at the outer circumference of the magnetic recording medium may work for alignment. Thus, a position, shape or number of the marker should be optimized in accordance with a configuration of the magnetic record medium.

FIG. 17 shows a method for writing the information signal formed on the master information carrier into a hard disk using the writing apparatus shown in FIG. 16. The writing apparatus shown in FIG. 16 utilizes an atmospheric pressure for ensuring a uniform contact in the whole area between the master information carriers 161a, 161b and the hard disk 162. The hard disk is forced to the master information carrier 161a, 161b when air between the master information carrier 161a, 161b and the hard disk 162 is sucked out via the through holes that are provided in the master information carrier 161a, 161b. Thus, the surface of the protruding portion of the embossed pattern formed on the master information carrier 161a, 161b contacts securely with the surface of the hard disk 162. Then, utilizing the permanent magnets 165a and 165b, the ferromagnetic film, formed on the surface of the protruding portion of the embossed pattern formed on the master information carrier 161a and 161b, is magnetized to write the information signal corresponding to the embossed pattern into the hard disk 162, according to the steps explained below.

Figure 18:
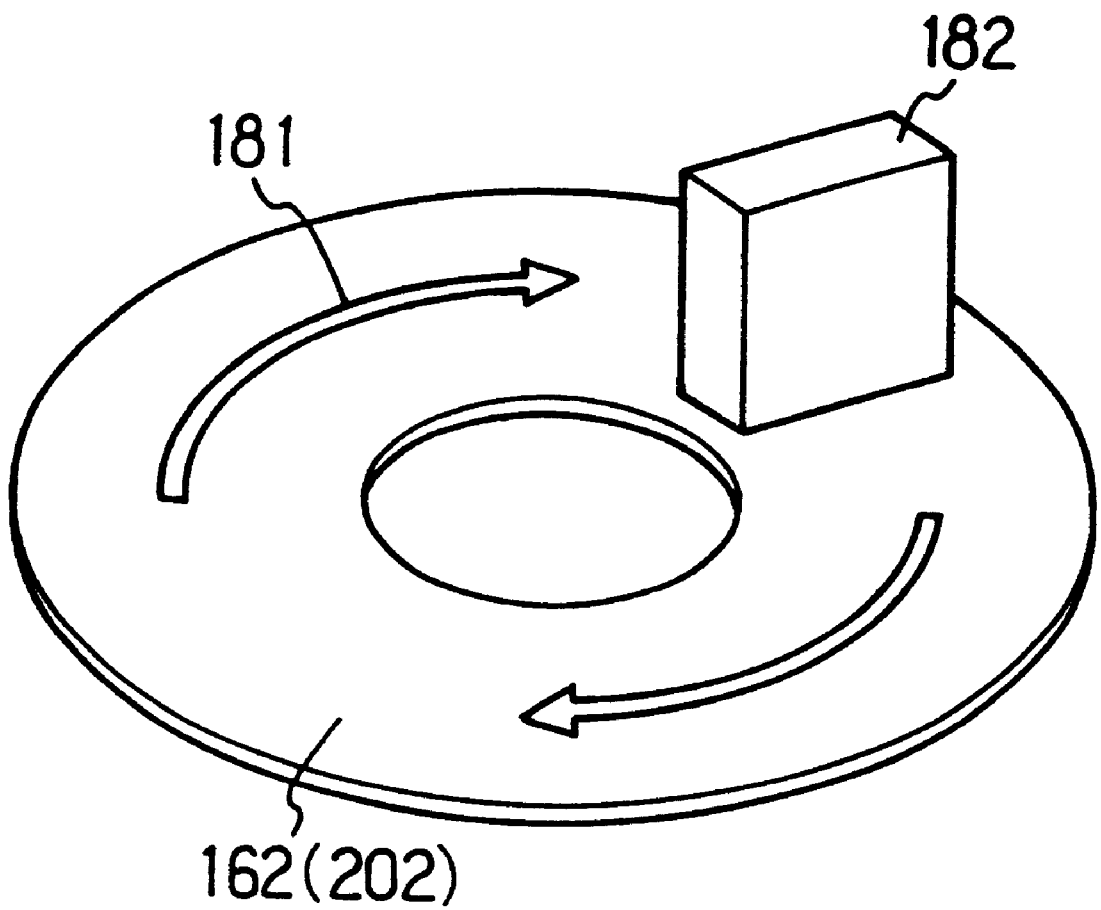
FIG. 18 is a perspective view showing an example of a method for pre-magnetizing the magnetic record medium.

First, by using a permanent magnet 182, the hard disk 162 is previously magnetized along the circumferential direction indicated by arrow 181 as shown in FIG. 18. The permanent magnet 182 can be replaced with an electromagnet. Then, as shown in FIG. 16, an O-ring 160 is set in the groove of the lower flange 164, on which the master information carrier 161b and the hard disk 162 are stacked on the hard disk 162.

At this time, the previously mentioned markers (154 in FIG. 15) formed on the master information carrier 161b should be aligned to the inner circumference of the hard disk 162. Then, another master information carrier 161a and the upper flange 163 with an O-ring 160 set in the groove are stacked on the hard disk 162. At this time too, markers formed on the master information carrier 161a should be aligned to the inner circumference of the hard disk 162.

Figure 17A:
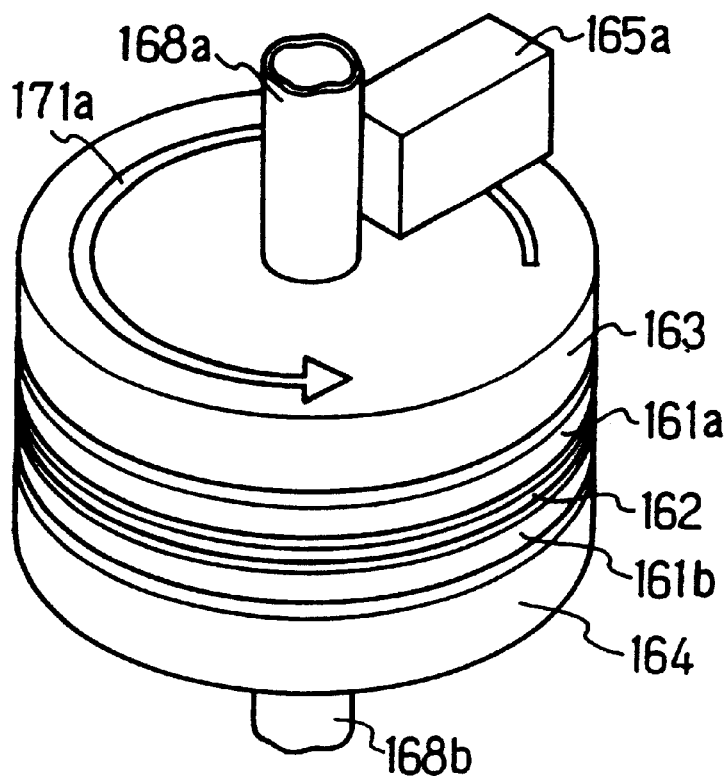
FIG. 17(a) is a perspective view showing a method for writing information signal of the master information carrier into a magnetic record medium using the apparatus shown in FIG. 16.

Operating the upper three-way valve 167a, air between the upper flange 163 and the master information carrier 161a is sucked out by the air suction device 166a. At this time, the lower three-way valve 167b should be opened so that atmospheric pressure exists in the space between the lower flange 164 and the master information carrier 161b. When air between the master information carrier 161a and the hard disk 162 is sucked out via through holes 169 provided to the master information carrier 161a, the hard disk 162 is pressed to the master information carrier 161a and they are contacted securely with each other. Then, as shown in FIG. 17(a), the permanent magnet 165a is moved around the suction duct 168a and in parallel to the surface of the upper flange 163 to apply a direct exciting field 171a. Thus, the ferromagnetic film of the protruding portion formed on the master information carrier 161a is magnetized to write the information signal corresponding to the embossed pattern into the hard disk 162. The hard disk 162 is previously magnetized along the direction of the circumference by using the permanent magnet as mentioned above. The polarity of this initial magnetization and the polarity of magnetic field applied by the permanent magnet 165a for writing information signal are usually opposite. However, as mentioned in the first embodiment, it may be preferable that they are the same polarity in some cases. Therefore, the suitable polarity should be selected to achieve a favorable S/N ratio. In an example, they were opposite.

Next, operating the lower three-way valve 167b, air between the lower flange 164 and the master information carrier 161b is sucked out by the air suction device 166b. At this time, the upper three-way valve 167a should be opened so that atmospheric pressure exists in the space between the upper flange 163 and the master information carrier 161a. When air between the master information carrier 161b and the hard disk 162 is sucked out via through holes 169 formed in the master information carrier 161b, the hard disk 162 is pressed to the master information carrier 161b and they are contacted securely with each other.

Figure 17B:
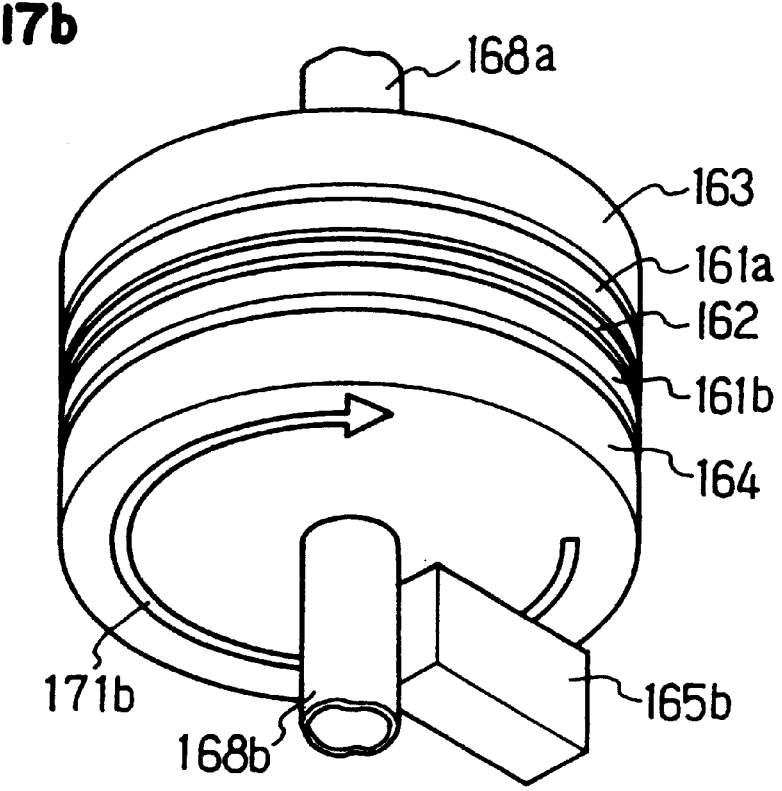
FIG. 17(b) is a perspective view showing another method for writing information signal of the master information carrier into a magnetic record medium using the apparatus shown in FIG. 16.

As shown in FIG. 17(b), the permanent magnet 165b is moved around the suction duct 168b and in parallel to the surface of the lower flange 164 to apply a direct exciting field 171b. Thus, the ferromagnetic film of the protruding portion formed on the master information carrier 161b is magnetized to write the information signal corresponding to the embossed pattern into the hard disk 162. In an example, the polarity of the initial magnetization applied to the hard disk 162 and the polarity of magnetic field applied by the permanent magnet 165b for writing information signal were opposite.

As explained above, preformat data is written into both sides of the hard disk 162 in a short time. An electromagnet can be used instead of the permanent magnet to magnetize the ferromagnetic film of the protruding portion formed on the master information carrier. It is desirable that the material of the upper and lower flanges 163, 164, between the permanent magnet and the master information carrier is a nonmagnetic material such as a brass, so that the ferromagnetic film on the surface of the master information carrier can be magnetized.

If the magnetic record medium is not a hard disk but a flexible disk in the configuration shown in FIG. 16, and if the through holes formed in the master information carrier are large, the flexible disk may be sucked partially into the through holes and deformed, resulting in failure of preformat writing into correct positions or in lack of signal to be written. Therefore, as mentioned before, it is preferable to provide as many small through holes as possible. Thus, this apparatus can write the preformat signal not only into a hard disk but also into a flexible disk with high reliability. The apparatus shown in FIG. 16 comprises a pair of master information carriers 161a and 161b disposed at both sides of the magnetic record medium, so the preformat writing can be performed efficiently in a short time for both sides of the magnetic record medium. Thus, productivity is further improved.

Figure 20:
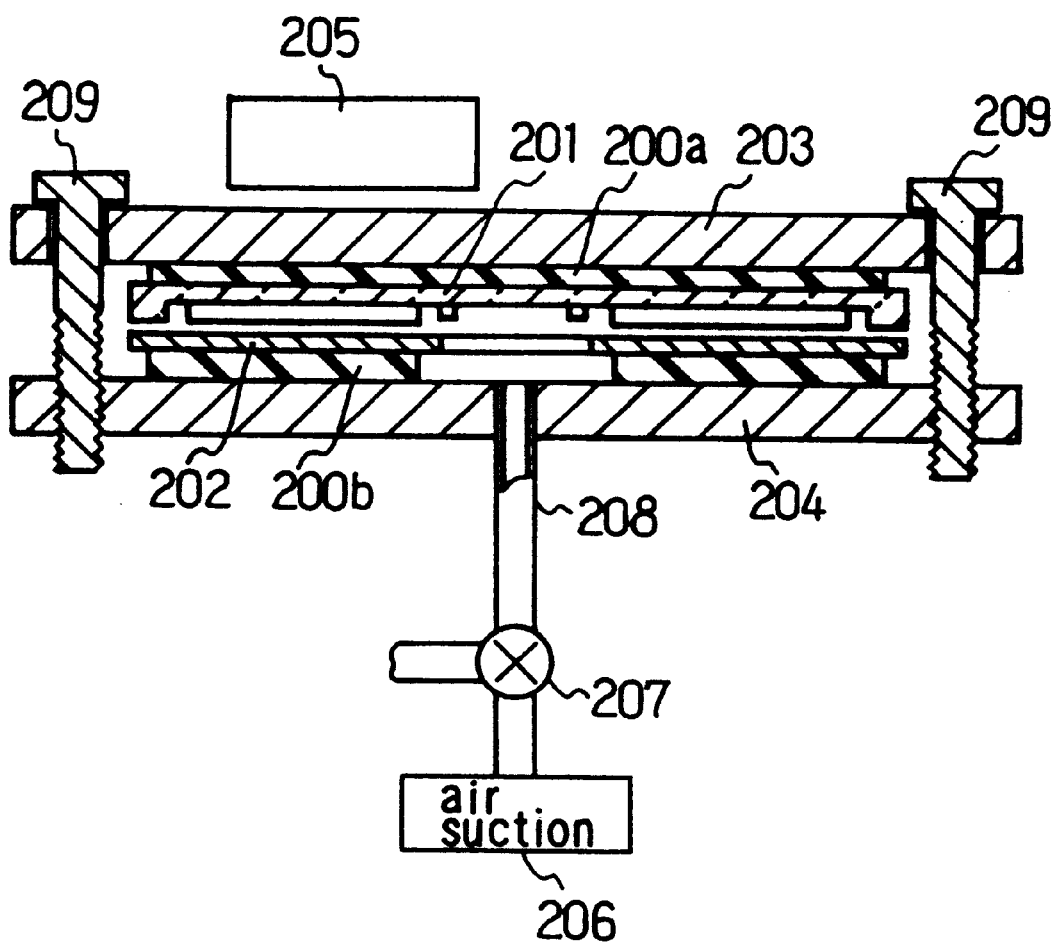
FIG. 20 is a partial cross section showing an apparatus for writing information signal of the master information carrier shown in FIG. 19 into a magnetic record medium.

FIG. 20 is a cross section showing another example of the apparatus for writing information signal provided in the master information carrier into a magnetic record medium. Numeral 201 denotes a master information carrier, 202 denotes a hard disk, 203 denotes an upper flange, 204 denotes a lower flange, 205 denotes a permanent magnet, 200a and 200b denote elastic plates, 206 denotes an air suction device, 207 denotes a three-way valve, 208 denotes a suction duct, and 209 denotes bolts for fastening the upper flange 203 and the lower flange 204.

Figure 19A:
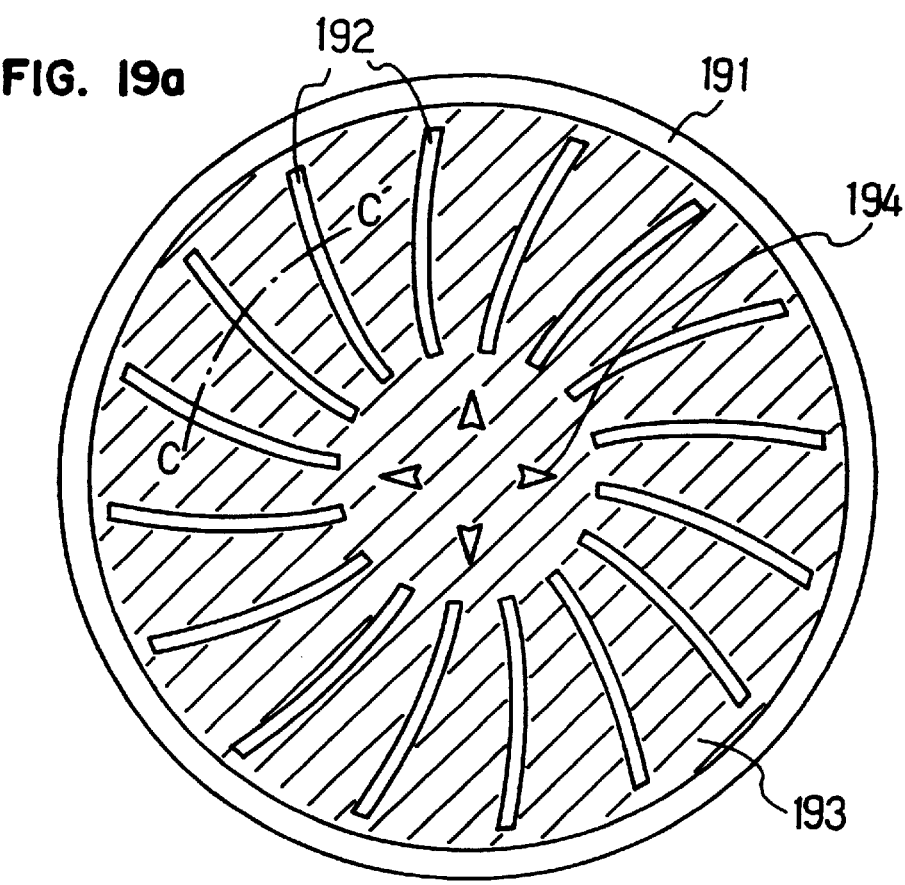
FIG. 19(a) is a plan view of a master information carrier according to the present invention.

The surface of the master information carrier 201 includes an area 192 disposed once every predetermined angular distance where a fine embossed pattern is formed corresponding to the information signal as shown in FIG. 19(a). Similarly to the configuration shown in FIG. 15, an example of enlarged pattern of this area 192 is shown in FIG. 1.

Figure 19B:
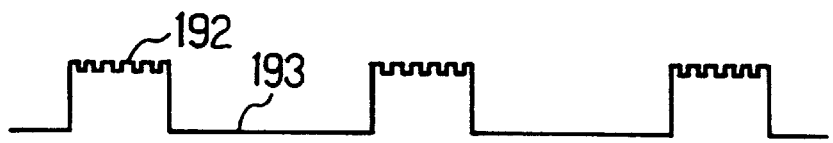
FIG. 19(b) show a surface contour of the master information carrier shown in FIG. 19(a) along the line C–C'.

In the master information carrier 191 shown in FIG. 19(a), compared with the areas 192 where the embossed pattern is formed and a peripheral area 191 (non-hatched area in FIG. 19(a)), the other area 193 (hatched area in FIG. 19(a)) has lower height of the surface. This area 193 is called "lowered area" hereinafter. FIG. 19(b) shows a surface contour of a section of FIG. 19(a) along the phantom curve line C—C'. On the surface of the area 192, the embossed pattern is formed corresponding to the information signal as shown in FIG. 1. After forming the embossed pattern by photolithography or other method, the lowered area 193 is formed by using a well-known method such as machining, supersonic process or laser process. The height difference between the area 192 where the embossed pattern is formed and the lowered area 193 is preferably more than 10 micron, more preferably more than 100 micron, though it depends on the thickness of the substrate of the master information carrier 191.

When writing the information signal formed on the master information carrier into a hard disk, i.e. a magnetic record medium, centering of the master information pattern and the hard disk is required before contacting them. As shown in FIG. 19(a), the master information carrier 191 has markers 194 at the inner circumference. The markers 194 are aligned to the inner circumference of the hard disk. Alternatively, markers can be disposed at the outer circumference of the master information carrier 191 to be aligned to the outer circumference of the hard disk.

Figure 21:
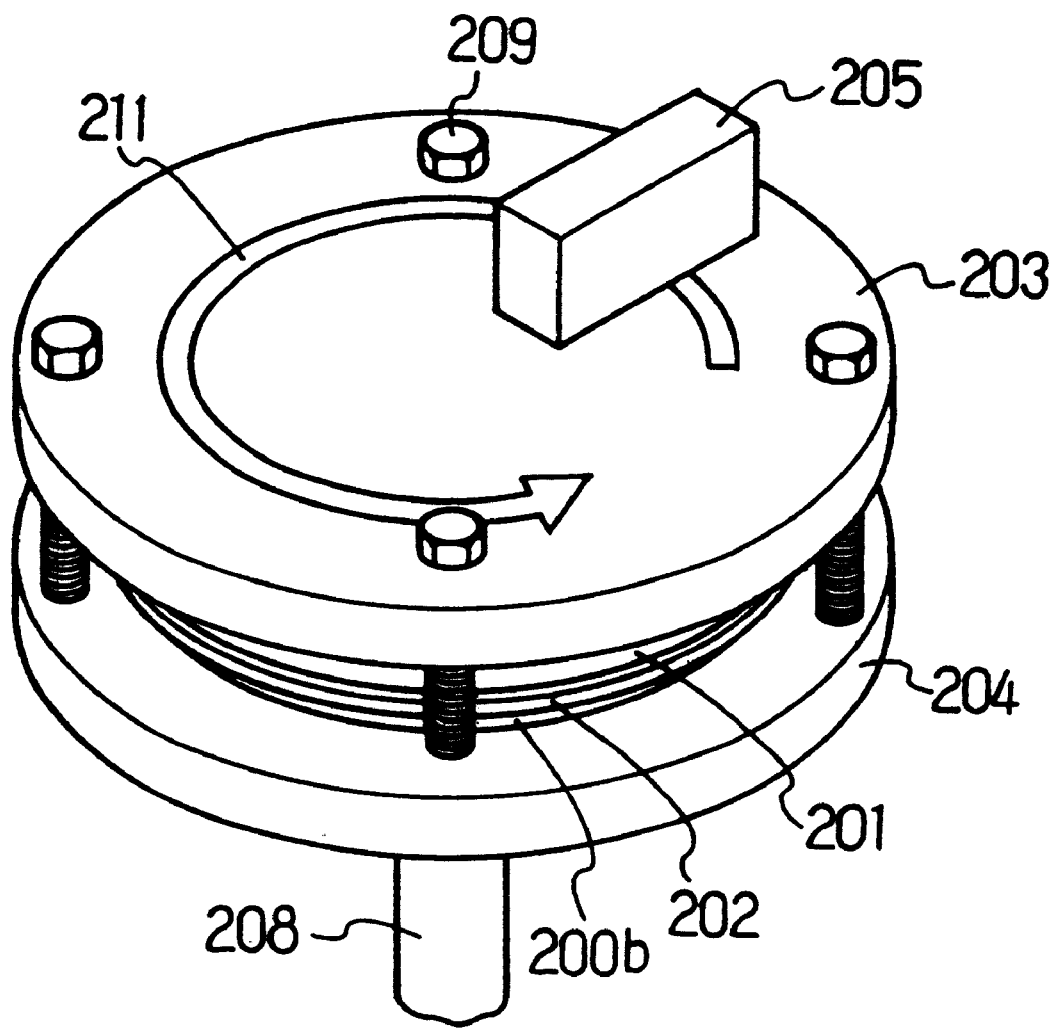
FIG. 21 is a perspective view showing a method for writing information signal of the master information carrier into a magnetic record medium using the apparatus shown in FIG. 20.

FIG. 21 shows a method for writing the master information formed on the master information carrier into a hard disk by using the writing apparatus shown in FIG. 20. The writing apparatus shown in FIG. 20 ensures a uniform contact between the master information carrier 201 and the hard disk 202 not only by utilizing an atmospheric pressure but also mechanically. There are spaces between the hard disk 202 and the lowered areas 193 of the master information carrier 201. Air in the spaces is sucked out for ensuring the secure contact between the hard disk and the area of the master information carrier where the embossed pattern is formed corresponding to the information signal. Then, utilizing the permanent magnet 205, the ferromagnetic film, formed on the surface of the protruding portion of the embossed pattern formed on the master information carrier 201 is magnetized to write the information signal corresponding to the embossed pattern into the hard disk 202 according to the steps explained below.

First, as shown in FIG. 18, by using a permanent magnet 182, the hard disk 202 is previously magnetized in the circumferential direction indicated by arrow 181. Then, as shown in FIG. 20, the elastic plate 200b, the hard disk 202 and the master information carrier 201 are stacked in turn on the lower flange 204. The elastic plate 200b has a through hole at the center, whose diameter is substantially the same as a center hole of the hard disk 202. At this time, the previously mentioned markers (194 in FIG. 19) should be aligned to the inner circumference of the hard disk 202. Then, another elastic plate 200a and upper flange 203 are stacked on the master information carrier 201. The elastic plates 200a and 200b can be made of a variety of materials such as a silicone rubber.

Operating the three-way valve 207, air between the lowered area 193 of the master information carrier 201 and the hard disk 202 is sucked out by the air suction device 206. As a result, the hard disk 202 and the area of the master information carrier where the embossed pattern is formed contact securely with each other. The suction duct 208 is disposed at the center of the apparatus as shown in FIG. 20, so an exhaust conductance is large at the center portion of the master information carrier 201. Therefore, the air suction effect is strong at the center portion but weak at the peripheral portion of the master information carrier 201. Consequently, it is possible that a secure contact between the hard disk 202 and the master information carrier 201 is not obtained at the peripheral portion.

To solve this problem, elastic plates 200a and 200b are disposed between the upper flange 203 and the master information carrier 201 as well as between the lower flange 204 and the hard disk 202, and in addition, the peripheral portions of the upper and lower flanges 203, 204 are fastened to each other with bolts 209, as shown in FIG. 20. Adjusting the fastening force of each bolt 209, the hard disk 202 and the master information carrier 201 are contact with each other securely and uniformly. Thus, the hard disk 202 and the area of the master information carrier 201 where the embossed pattern is formed corresponding to the information signal are contact with each other uniformly over a whole surface.

Finally, as shown in FIG. 21, a direct exciting field 211 is applied by moving the permanent magnet 205 along circumferential direction and in parallel to the surface of the upper flange 203. By this operation, the ferromagnetic film of the protruding portion of the embossed pattern corresponding to the information signal is magnetized and the information signal is written into the hard disk 202. The hard disk 202 is previously magnetized along the circumferential direction by using the permanent magnet. The polarity of this initial magnetization and the polarity of magnetic field applied by the permanent magnet 205 are usually opposite. However, in some cases, the same polarity between them is preferable depending on the embossed pattern formed on the master information carrier. Therefore, the suitable polarity should be selected for good S/N ratio of the read signal according to each condition of application. In one example, they were opposite.

It is desirable that a material of the upper flange 203 is a nonmagnetic material such as a brass since the upper flange 203 is placed between the permanent magnet 205 and the master information carrier 201.

As mentioned above, the configuration shown in FIG. 20 can obtain a more reliable preformat writing by sucking out the air between the hard disk and the lowered area of the master information carrier, and by fastening the peripheral portion of them with the bolts.

The present invention, though explained with several examples, can be utilized in a variety of embodiments. For example, the applications of the present invention are not limited to preformat writing of a magnetic disk, but include preformat writing of a magnetic card, magnetic tape, or other magnetic record medium.

The present invention can be applied to writing information signals into a magneto-optical record medium or other magnetic record media that use a variety of optical effects for reproducing the signal. When writing information signal into a magneto-optical record medium by using the method of the present invention, the magneto-optical record medium may be heated to the Curie temperature or near the compensation temperature to perform writing under the condition where the spontaneous magnetization is vanished. This method is called a "thermo-magnetic writing method" and is advantageous.

Furthermore, the information signal to be written into the magnetic record medium is not limited to the preformat data such as a tracking servo signal, address, clock and other signals. It is possible to apply the present invention to writing a variety of data, audio, video or other signals. In these applications, mass production of software can be performed by utilizing the present invention to provide software at low cost.

What is claimed is:

1. A master information carrier for writing an information signal into a magnetic record medium, wherein an embossed pattern corresponding to the information signal is formed on a substrate, at least a protruding portion of the embossed pattern is composed of a ferromagnetic material layer having a saturation magnetic flux density more than 0.8 T, and the ferromagnetic material layer composing the protruding portion is not continuous between adjacent protruding portions, but divided by recessed portions.

2. The master information carrier according to claim 1, wherein an embossed pattern corresponding to a digital information signal is formed on a surface of the substrate, a cross section of the protruding portion along bit length direction of the digital information signal has a substantially trapezoidal shape with an upper side at a surface that is shorter than a lower side on the substrate, and a length difference between the upper and lower sides is not more than twice the height of the trapezoid.

3. The master information carrier according to claim 2, wherein curvature radii at edges of the upper side of the trapezoid are not more than a half of the upper side length.

4. The master information carrier according to claim 2, wherein a thickness of the ferromagnetic material layer at the protruding portion is not more than a half of the upper side length, so that the master information carrier is suitable for writing information into an in-plane magnetic record medium.

5. The master information carrier according to claim 2, wherein a thickness of the ferromagnetic material layer at the protruding portion is more than twice of the upper side length, so that the master information carrier is suitable for writing information into a perpendicular magnetic record medium.

6. The master information carrier according to claim 1, wherein an embossed pattern corresponding to a digital information signal is formed on a surface of the substrate, and a cross section of the protruding portion along bit length direction of the digital information signal has a substantially trapezoidal shape with an upper side at a surface that is longer than a lower side on the substrate.

7. The master information carrier according to claim 6, wherein a thickness of the ferromagnetic material layer at the protruding portion is not more than a half of the upper side length, so that the master information carrier is suitable for writing information into an in-plane magnetic record medium.

8. The master information carrier according to claim 6, wherein a thickness of the ferromagnetic material layer at the protruding portion is more than twice of the upper side length, so that the master information carrier is suitable for writing information into a perpendicular magnetic record medium.

9. A master information carrier for writing an information signal into a magnetic record medium, wherein an embossed pattern corresponding to the information signal is formed on a substrate, at least a protruding portion of the embossed pattern is composed of a ferromagnetic material layer having a coercive force not more than 40 kA/m in the inplane direction, and the ferromagnetic material layer composing the protruding portion is not continuous between adjacent protruding portions, but divided by recessed portions.

10. The master information carrier according to claim 9, wherein an embossed pattern corresponding to a digital information signal is formed on a surface of the substrate, a cross section of the protruding portion along bit length direction of the digital information signal has a substantially trapezoidal shape with an upper side at a surface that is shorter than a lower side on the substrate, and a length difference between the upper and lower sides is not more than twice the height of the trapezoid.

11. The master information carrier according to claim 10, wherein curvature radii at edges of the upper side of the trapezoid are not more than a half of the upper side length.

12. The master information carrier according to claim 10, wherein a thickness of the ferromagnetic material layer at the protruding portion is not more than a half of the upper side length, so that the master information carrier is suitable for writing information into an in-plane magnetic record medium.

13. The master information carrier according to claim 10, wherein a thickness of the ferromagnetic material layer at the protruding portion is more than twice of the upper side length, so that the master information carrier is suitable for writing information into a perpendicular magnetic record medium.

14. The master information carrier according to claim 9, wherein an embossed pattern corresponding to a digital information signal is formed on a surface of the substrate, and a cross section of the protruding portion along bit length direction of the digital information signal has a substantially trapezoidal shape with an upper side at a surface that is longer than a lower side on the substrate.

15. The master information carrier according to claim 14, wherein a thickness of the ferromagnetic material layer at the protruding portion is not more than a half of the upper side length, so that the master information carrier is suitable for writing information into an in-plane magnetic record medium.

16. The master information carrier according to claim 14, wherein a thickness of the ferromagnetic material layer at the protruding portion is more than twice the upper side length, so that the master information carrier is suitable for writing information into a perpendicular magnetic record medium.

* * * * *

UNITED STATES PATENT AND TRADEMARK OFFICE
CERTIFICATE OF CORRECTION

PATENT NO. : 6,347,016 B1
DATED : February 12, 2002
INVENTOR(S) : Ishida et al.

It is certified that error appears in the above-identified patent and that said Letters Patent is hereby corrected as shown below:

<u>Title page,</u>
Item [75], Inventors: -- Kazunari Yoshimoto, Kyoto; -- should be inserted after "Kiyokazu Tohma, Osaka;" and before "Keizou Miyata, Osaka;"

Signed and Sealed this

Fourteenth Day of January, 2003

JAMES E. ROGAN
*Director of the United States Patent and Trademark Office*